June 1, 1937.  R. C. CLERK  2,082,382
GEAR CHANGING MECHANISM FOR MOTOR VEHICLES
Filed Oct. 20, 1934  15 Sheets-Sheet 1

Inventor:
Robert C. Clerk
By [signature]
Attorney

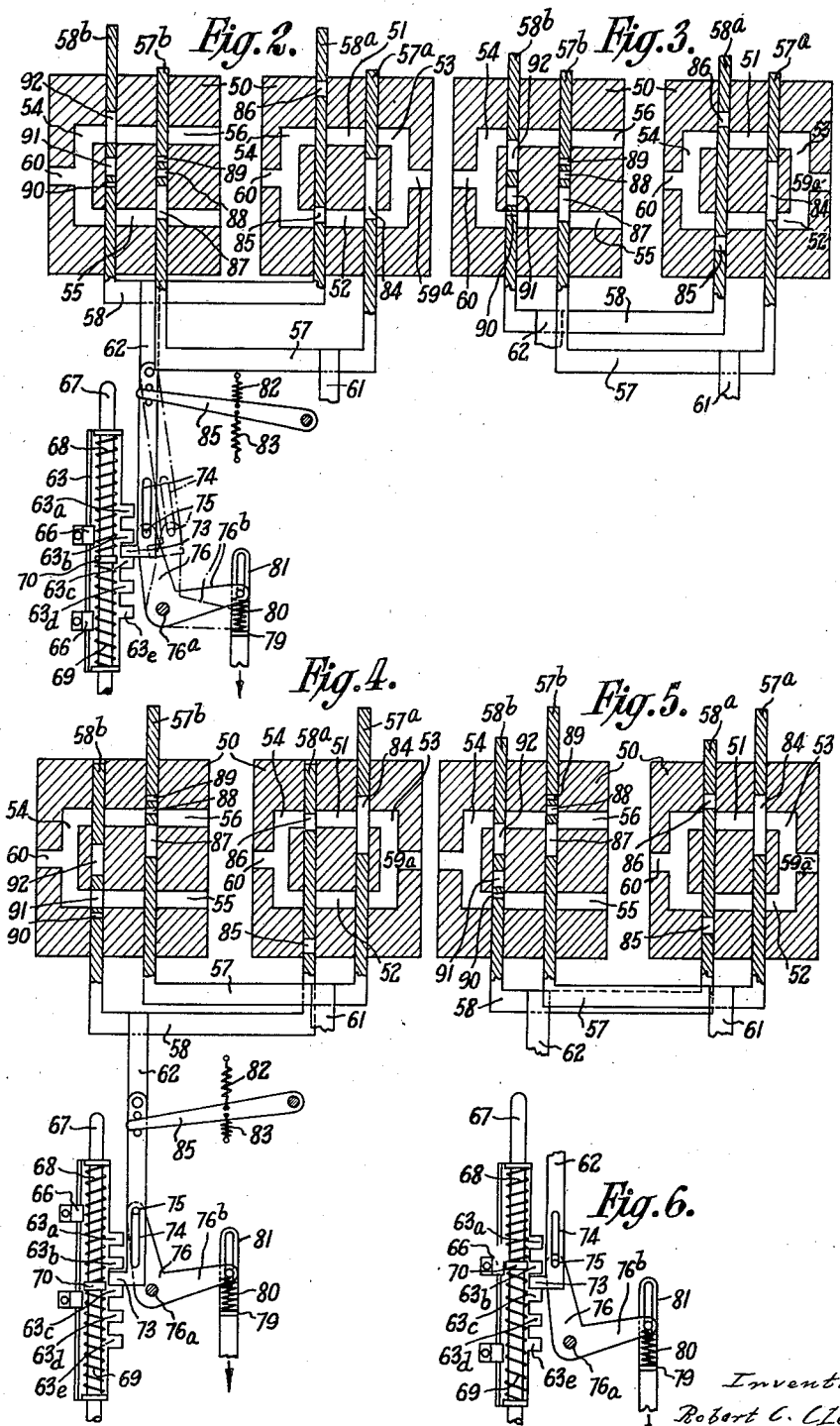

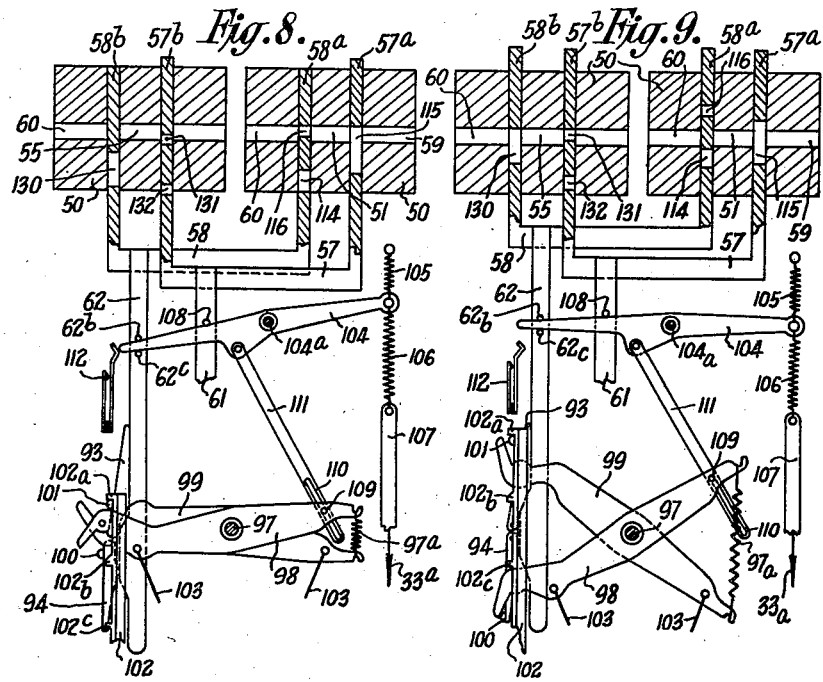
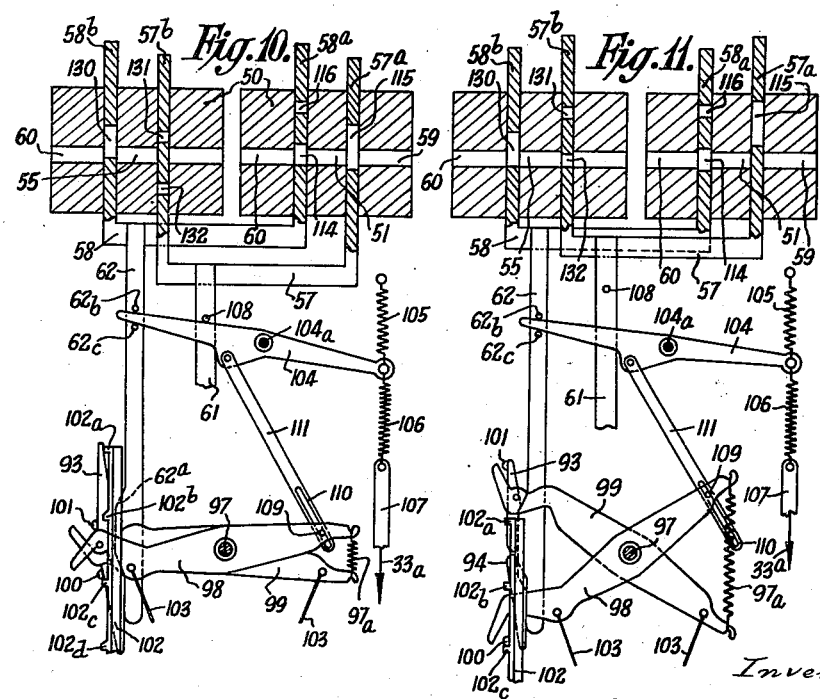

June 1, 1937.  R. C. CLERK  2,082,382
GEAR CHANGING MECHANISM FOR MOTOR VEHICLES
Filed Oct. 20, 1934   15 Sheets-Sheet 5

Inventor:
Robert C. Clerk
By
Attorney

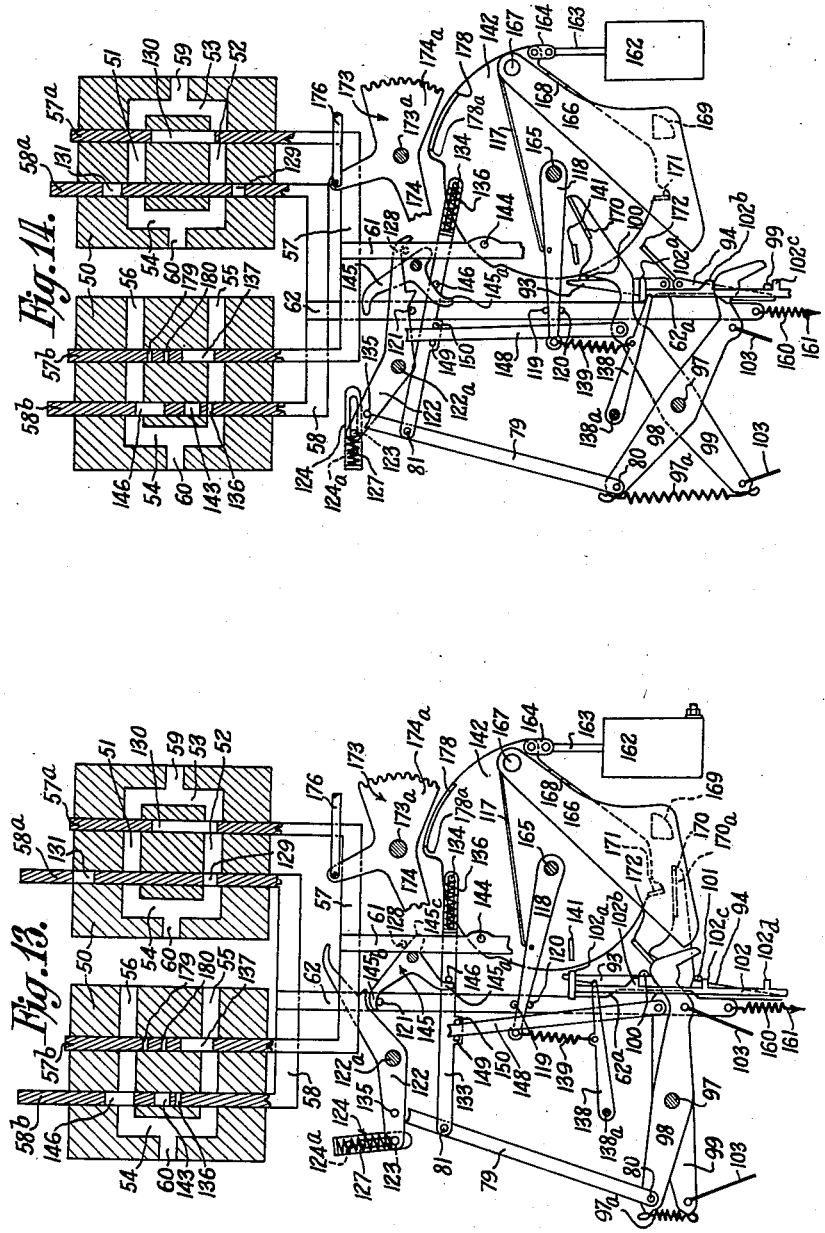

June 1, 1937.  R. C. CLERK  2,082,382
GEAR CHANGING MECHANISM FOR MOTOR VEHICLES
Filed Oct. 20, 1934  15 Sheets-Sheet 7
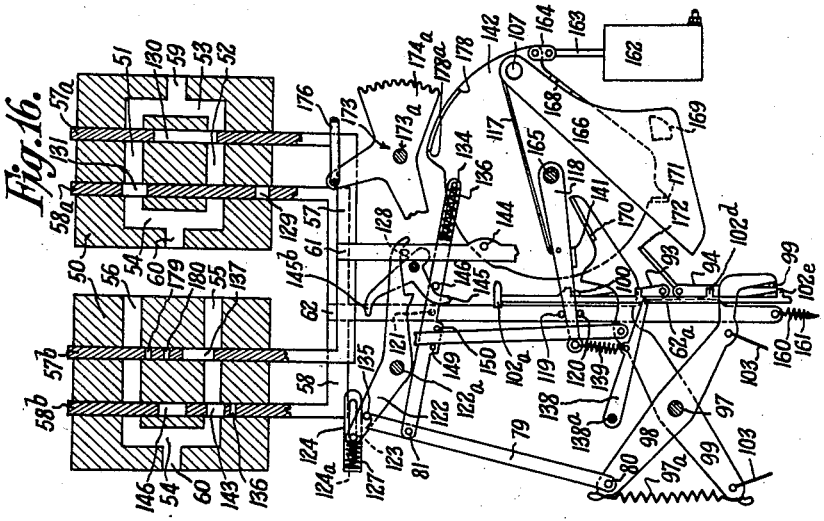
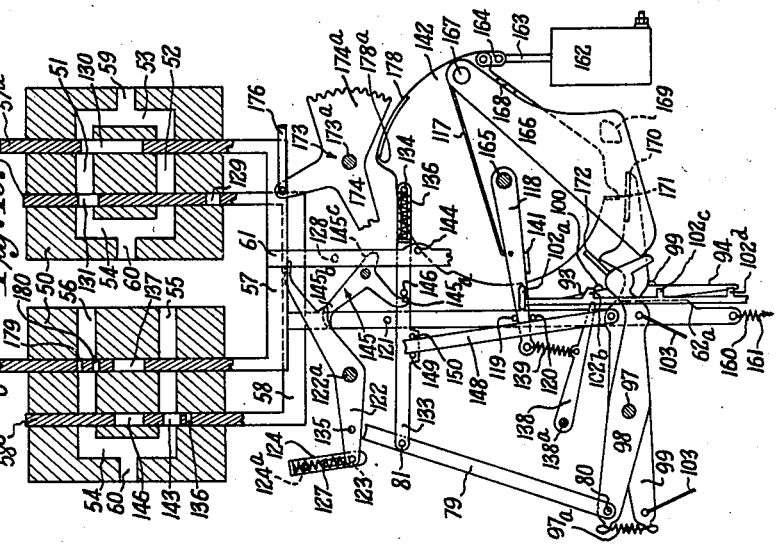
Inventor:
Robert C. Clerk
By
Attorney June 1, 1937. R. C. CLERK 2,082,382
GEAR CHANGING MECHANISM FOR MOTOR VEHICLES
Filed Oct. 20, 1934 15 Sheets-Sheet 8
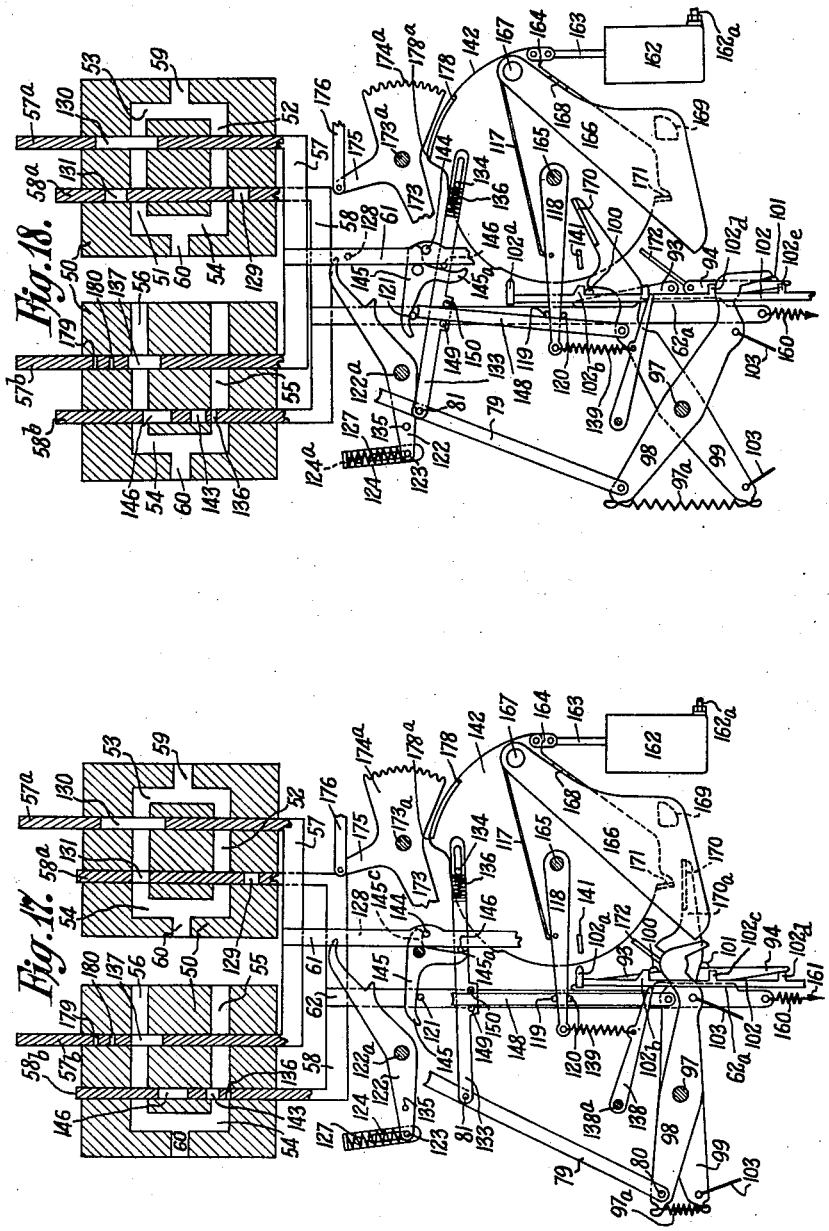
Inventor:
Robert C. Clerk
By [signature]
Attorney

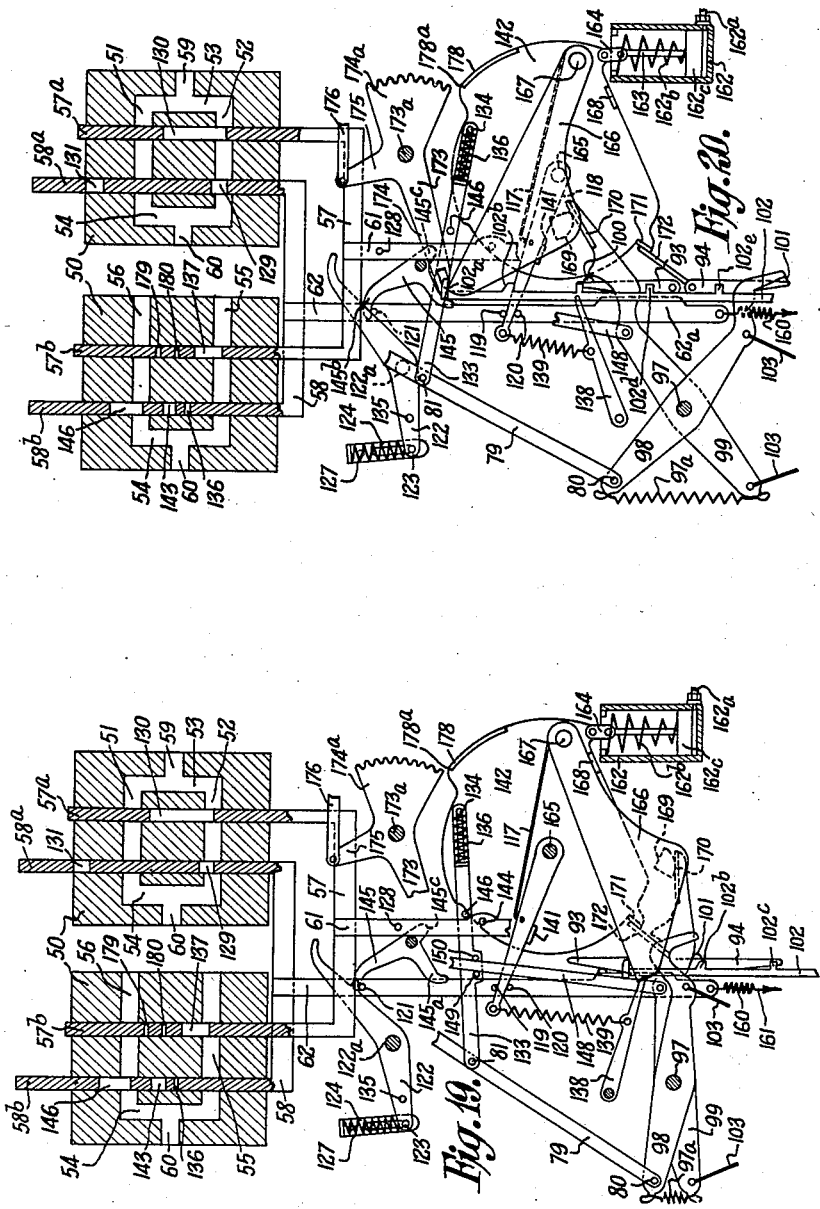

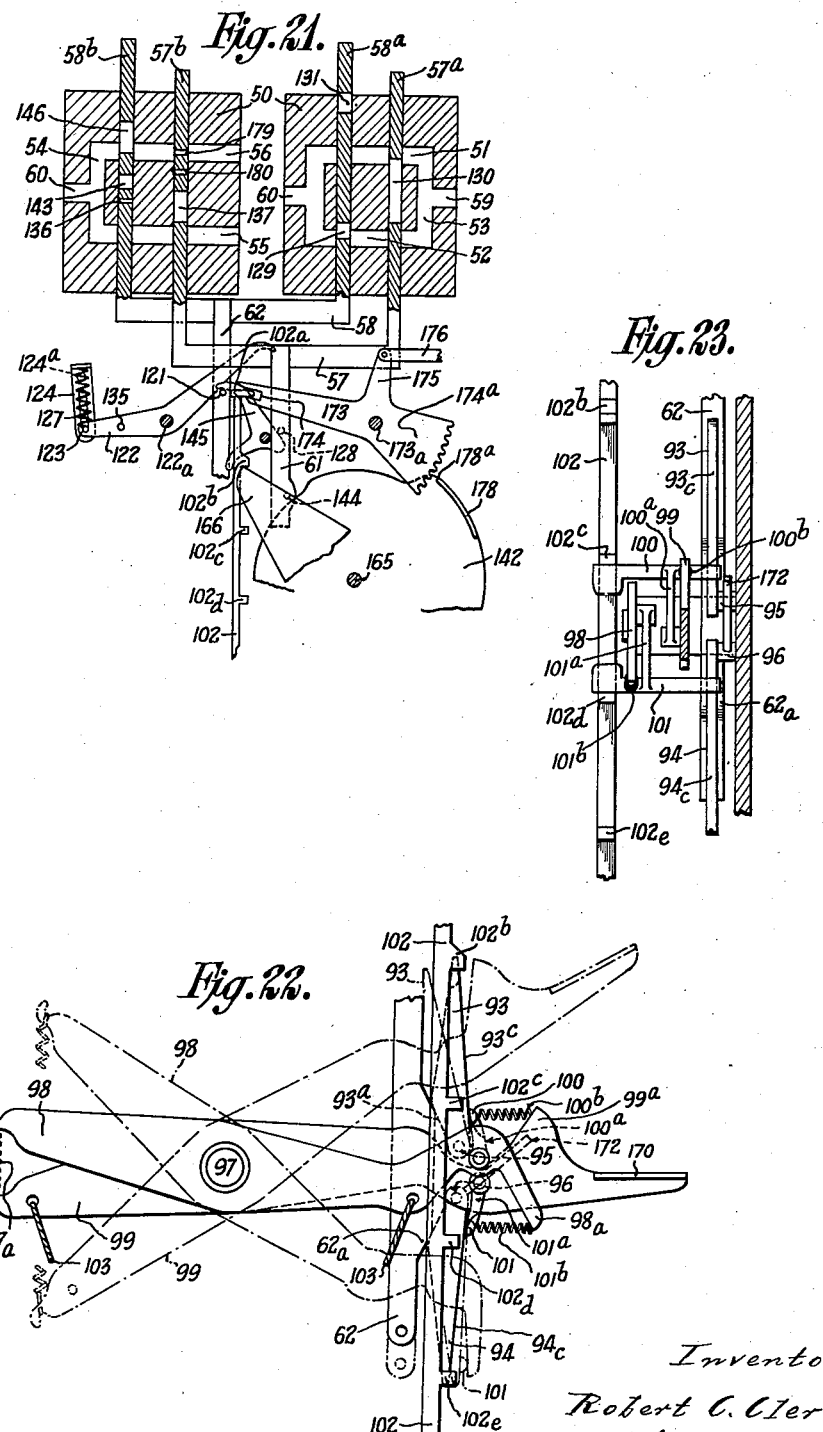

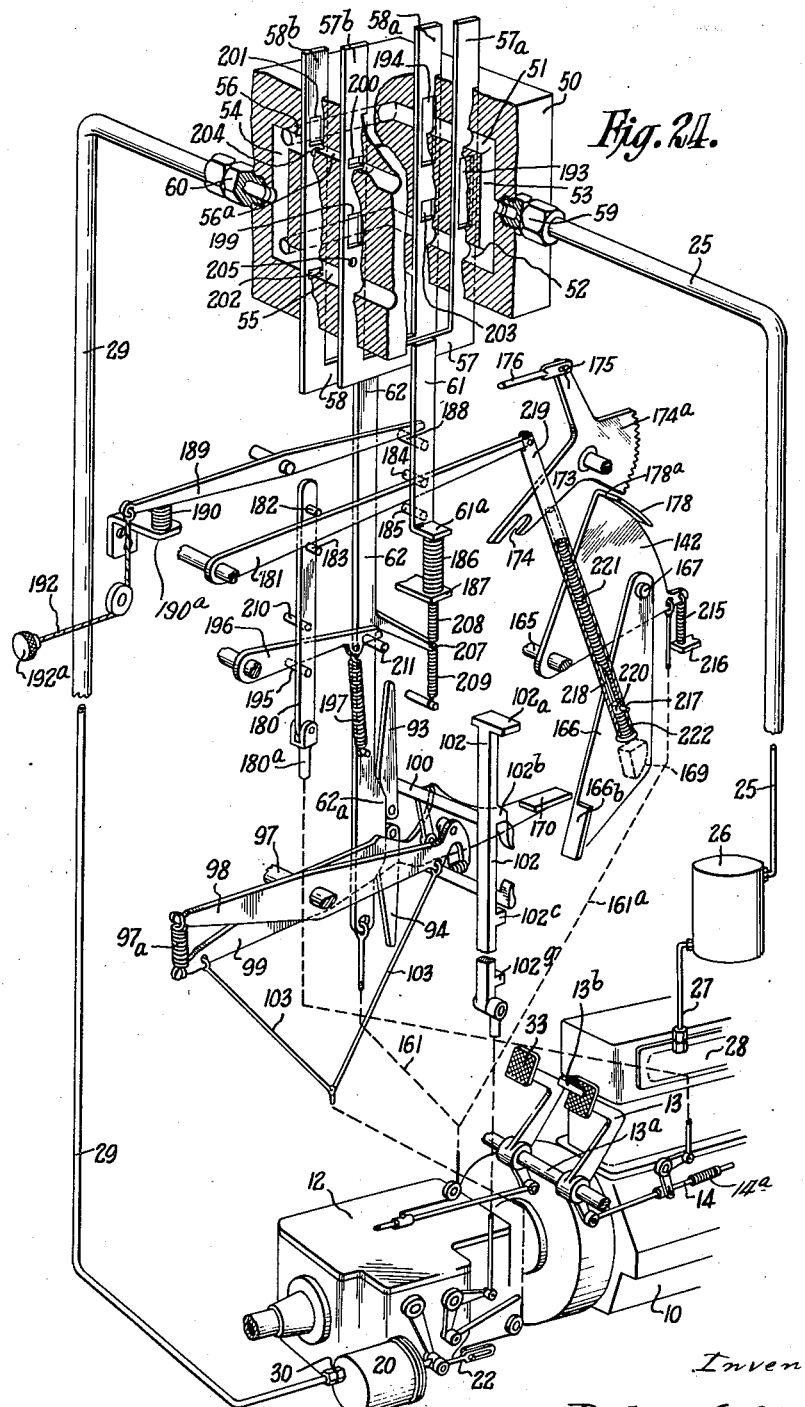

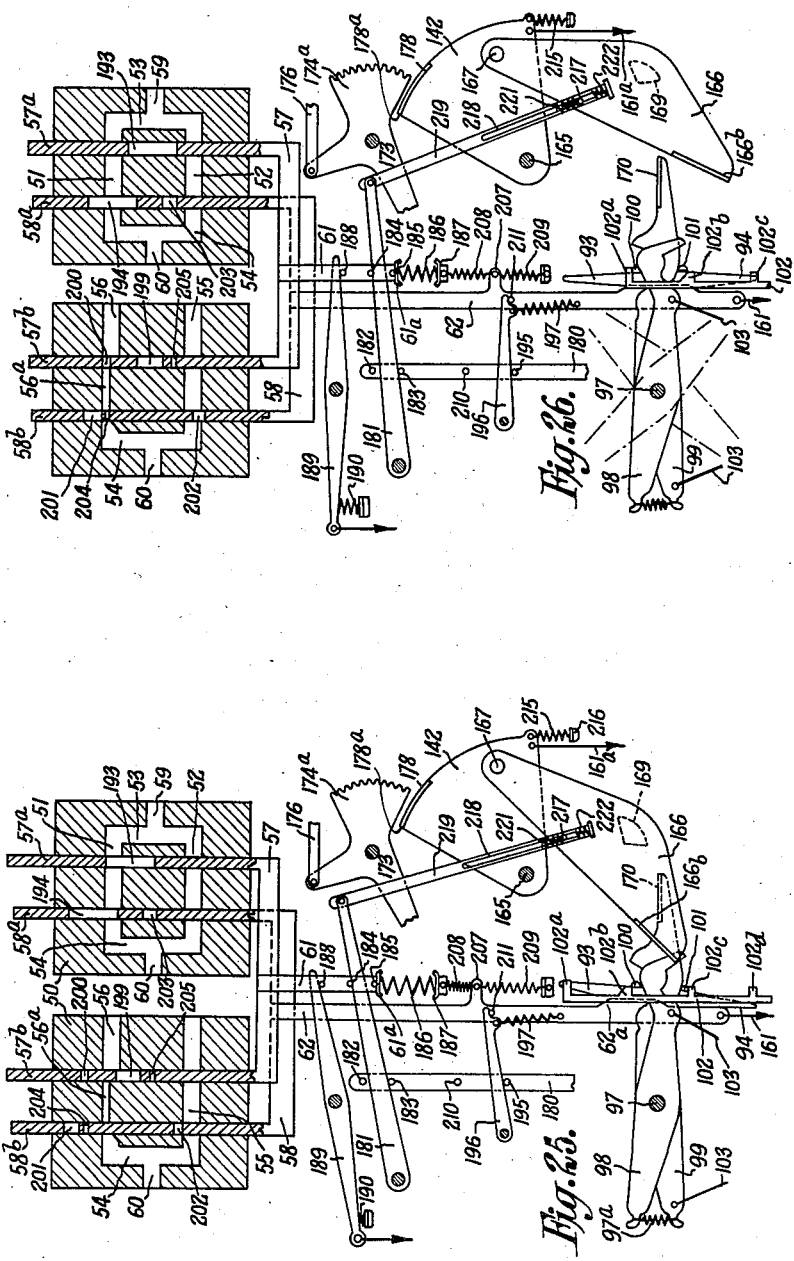

June 1, 1937. R. C. CLERK 2,082,382
GEAR CHANGING MECHANISM FOR MOTOR VEHICLES
Filed Oct. 20, 1934 15 Sheets-Sheet 13
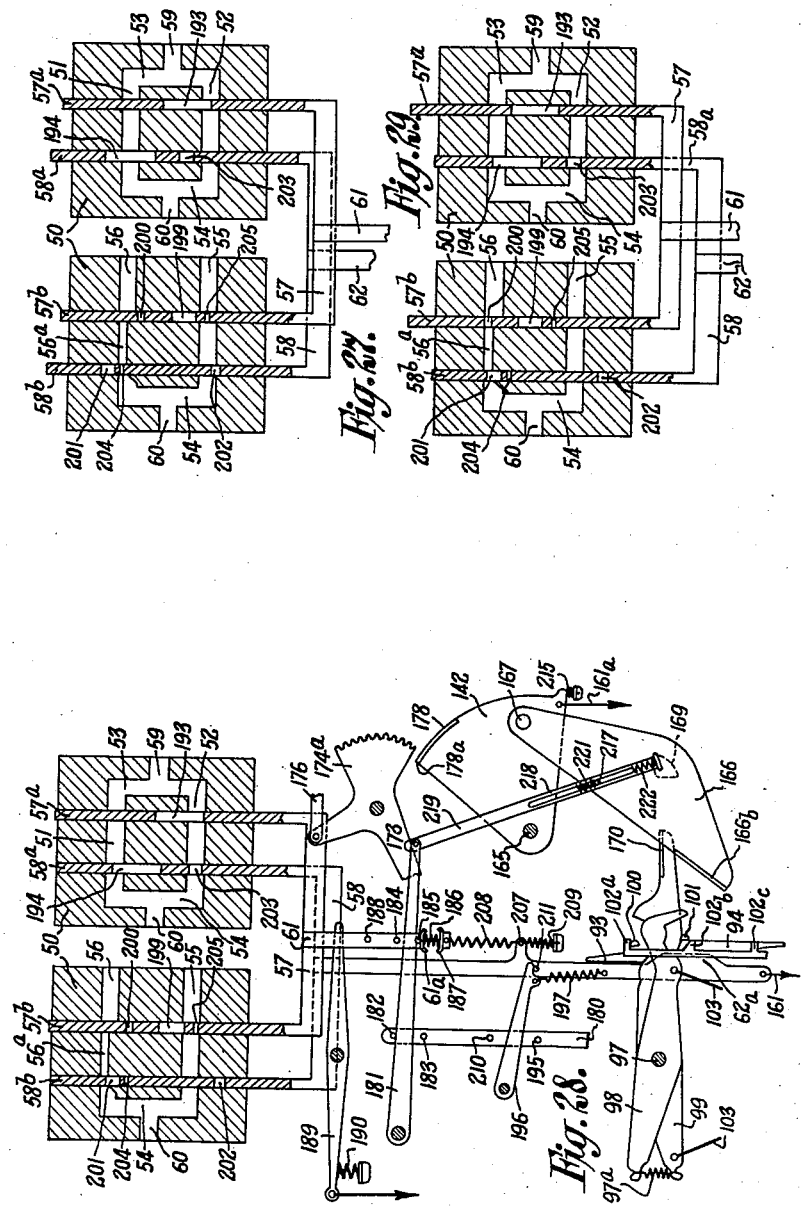

June 1, 1937.   R. C. CLERK   2,082,382
GEAR CHANGING MECHANISM FOR MOTOR VEHICLES
Filed Oct. 20, 1934   15 Sheets-Sheet 14
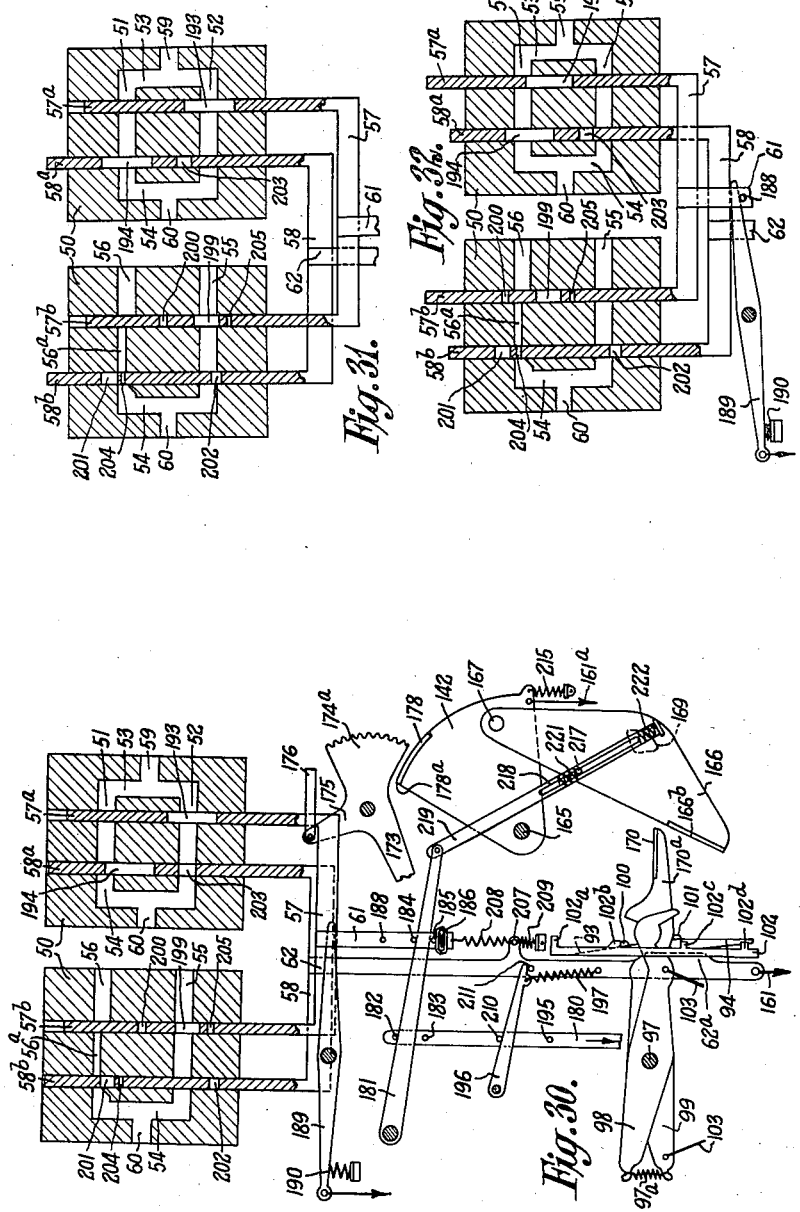
Inventor:
Robert C. Clerk
By
Attorney.

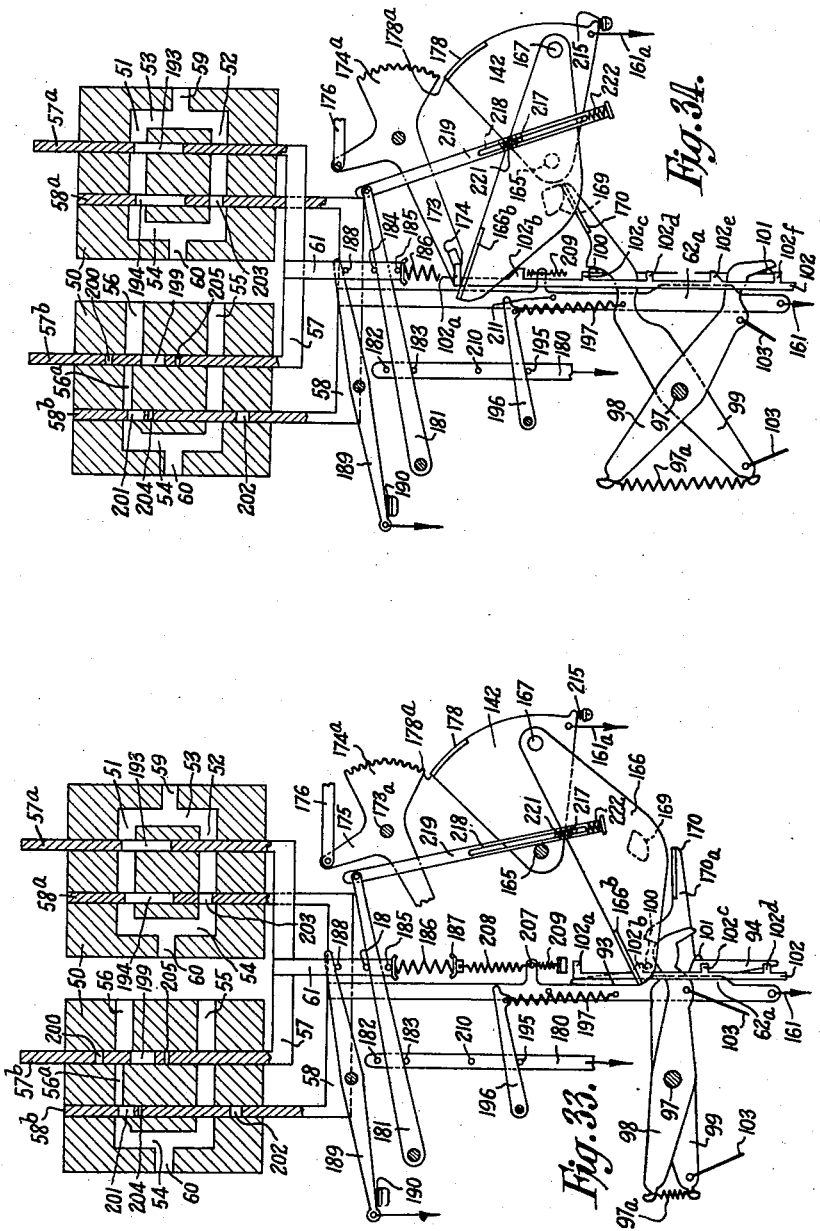

Patented June 1, 1937

2,082,382

UNITED STATES PATENT OFFICE 2,082,382

GEAR-CHANGING MECHANISM FOR MOTOR VEHICLES

Robert Cecil Clerk, Kingston, Jamaica, British West Indies

Application October 20, 1934, Serial No. 749,262
In Great Britain October 20, 1933

25 Claims. (Cl. 192—.01)

This invention relates to gear-changing mechanism for motor vehicles and more particularly to mechanism of this kind for use in vehicles having change-speed gears of the linear, straight gate or preselecting self-changing type and has for its object to render unnecessary the normal manual operation of the clutch, and, in its fully automatic form, the gear-selecting lever.

According to this invention provision is made of gear-changing mechanism for use in motor vehicles whereby the operation of the clutch and change-speed gear changing means of the vehicle is effected by a fluid pressure differential created by the passage of a fluid through multiple series valves which are selectively controlled by the movements of the accelerator and/or brake and/or gear changing means.

In order that the invention may clearly be understood in its practical application several constructional embodiments thereof will now be described with reference to the accompanying drawings in which:

Fig. 2 is a diagrammatic view showing one of the several operative positions of the multiple series valves which form an essential part of the gear changing mechanism of this invention;

Fig. 3 is a view similar to Fig. 2 showing the valves in another position;

Fig. 4 is another view similar to Fig. 2 showing the valves in still another position;

Fig. 5 is still another view similar to Fig. 2 showing the valves in another position;

Fig. 6 is a detail view of a portion of the mechanism;

Fig. 8 is a diagrammatic view showing one of the several operative positions of the multiple series valves in the operation of this embodiment of the invention;

Fig. 9 is a view similar to Fig. 8 showing the valves in another position;

Fig. 10 is another view similar to Fig. 8 showing the valves in another position;

Fig. 11 is still another view similar to Fig. 8 showing the valves in still another position;

Fig. 13 is a diagrammatic view showing one of the operative positions of the multiple series valves in the operation of this embodiment of the invention;

Fig. 14 is a view similar to Fig. 13 showing the valves in another position;

Fig. 15 is another view similar to Fig. 13 showing the valves in another position;

Fig. 16 is still another view similar to Fig. 13 showing the valves in another position;

Fig. 17 is a further view similar to Fig. 13 showing the valves in another position;

Fig. 18 is a still further view similar to Fig. 13 showing the valves in another position;

Fig. 19 is yet another view similar to Fig. 13 showing the valves in another position;

Fig. 20 is an additional view similar to Fig. 13 showing the valves in another position;

Fig. 21 is another additional view similar to Fig. 13 showing the valves in another position;

Fig. 22 is a detail view drawn to a larger scale of gear selecting mechanism forming part of the last mentioned embodiment;

Fig. 23 is another detail view partly in section of a portion of the gear selecting mechanism;

Figure 1:
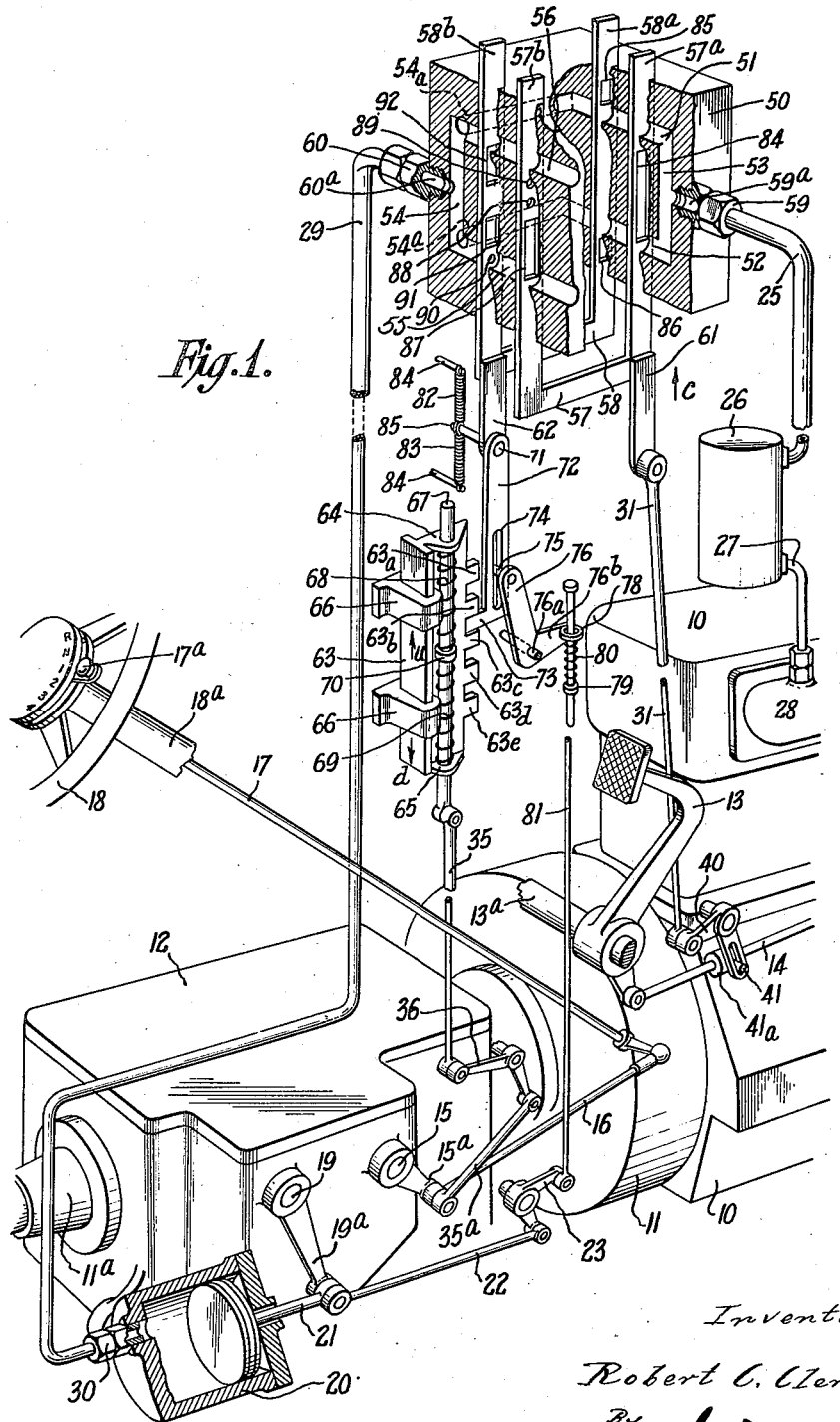
Fig. 1 is a schematic view, in perspective, of a semi-automatic arrangement of gear changing mechanism according to the present invention shown applied to the power unit of a motor vehicle which is provided with a manually operated preselective change-speed gear unit.
Figure 7:
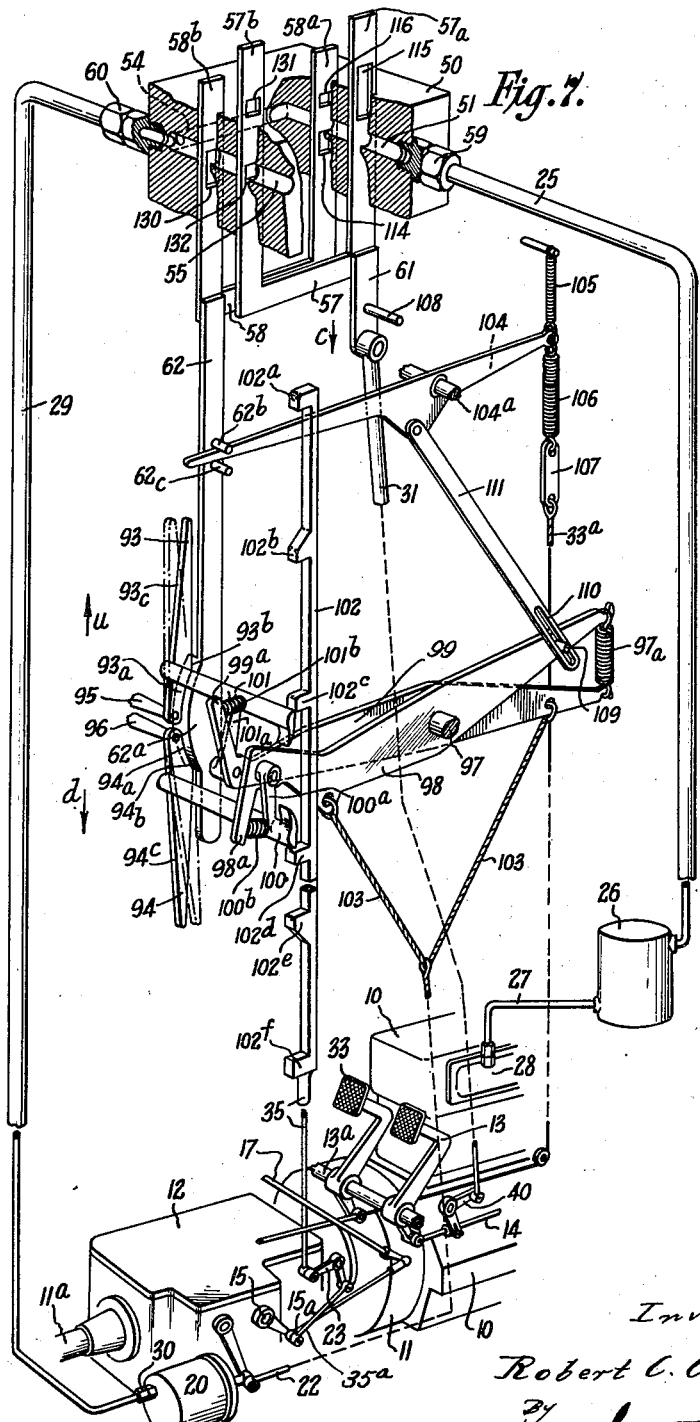
Fig. 7 is a schematic perspective view similar to Fig. 1 but showing a modification of the gear changing mechanism of this invention arranged to effect the fully automatic selection and change of the change-speed gears of a racing motor.
Figure 12:
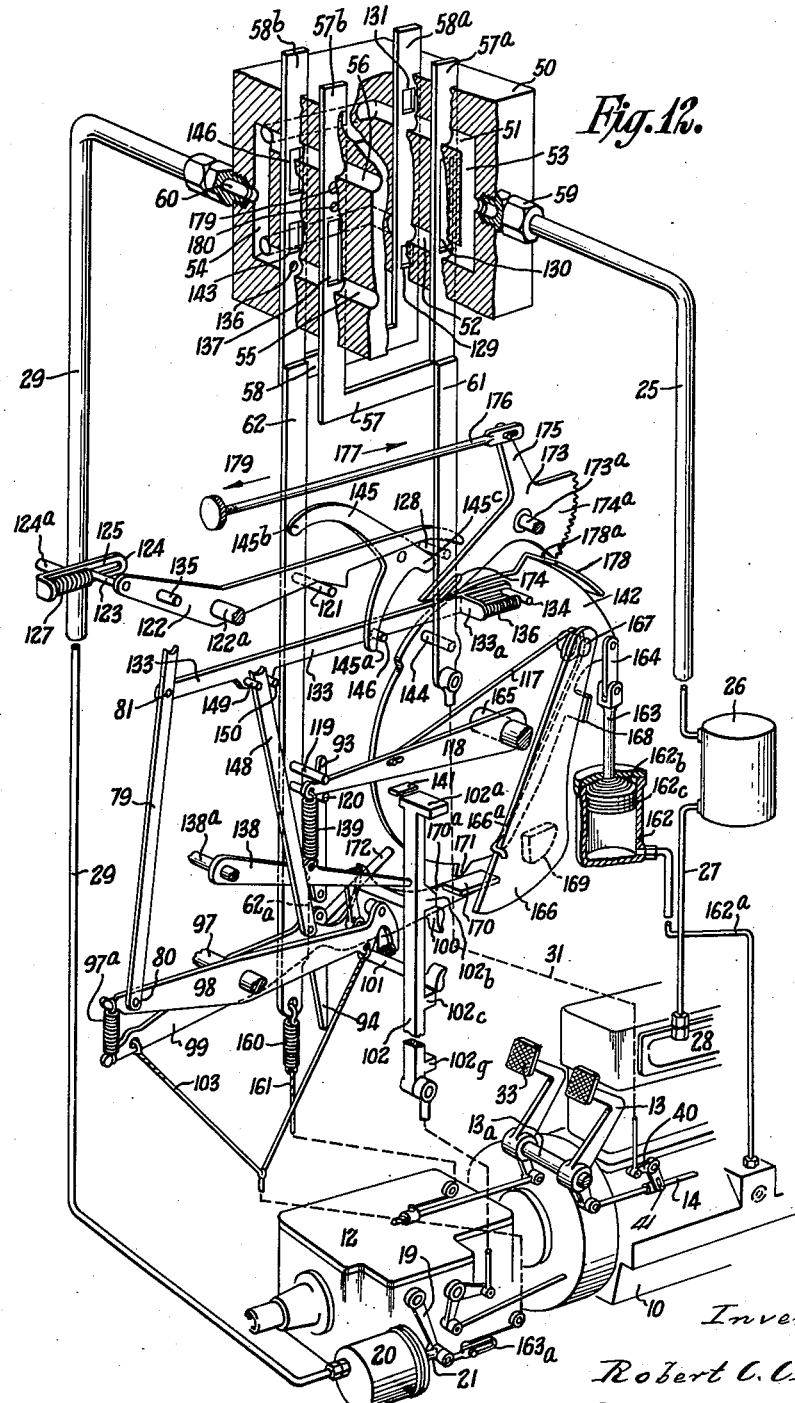
Fig. 12 is a schematic perspective view similar to that shown in Figs. 1 and 7, but showing a further modification of the gear-changing arrangement of this invention as applied to a motor vehicle for ordinary road service, to effect the fully automatic selection and change of the change-speed gears thereof.

Fig. 24 is a schematic perspective view similar to Figs. 1, 7, and 12 showing a further modification of the gear-changing mechanism of this invention applied to the power unit of a motor vehicle to effect a substantially full automatic selection and change of the change-speed gears of the vehicle, while Fig. 25 is a diagrammatic view showing one of the operative positions of the multiple series valves in the operation of this embodiment of the invention.

Fig. 26 is a view similar to Fig. 25 showing the valves in another position;

Fig. 27 is another view similar to Fig. 25 showing the valves in another position;

Fig. 28 is still another view similar to Fig. 25 showing the valves in another position;

Fig. 29 is a further view similar to Fig. 25 showing the valves in another position;

Fig. 30 is a still further view similar to Fig. 25 showing the valves in another position;

Fig. 31 is yet another view similar to Fig. 25 showing the valves in another position;

Fig. 32 is an additional view similar to Fig. 25 showing the valves in another position;

Fig. 33 is another additional view similar to Fig. 25 showing the valves in another position; and Fig. 34 is a further additional view similar to Fig. 25 showing the valves in another position.

In the following description similar references are used to indicate similar parts of the mechanism in the various embodiments of the invention.

To clarify the positioning of the valve slides in relation to the passages of the valve block in each of the diagrammatic figures of the drawings numbered as above and hereinafter specifically referred to the valve block is represented by two juxtaposed sectional elevations the right hand section showing the vacuum passages and associated valve slides while the left hand section shows the air passages and associated valve slides.

Referring to Figs. 1–6, and more particularly to Fig. 1, the invention is shown applied to the change speed gears of a motor vehicle for the purpose of effecting the gear changing operations in a semi-automatic manner. Shown in schematic perspective in Fig. 1 is the prime mover 10 of the motor vehicle, comprising a multi-cylinder internal combustion engine which may be of any standard type. The crank shaft of the engine (not shown) drives a flywheel in the casing 11 while a change-speed gear set and clutch means housed in a gearbox 12 are arranged to transmit the engine drive to the propeller shaft 11a. In the present constructional example the gear set is of the pre-selective and power change type and since it forms no part of the present invention neither its arrangement within the gearbox 12 nor the principles of its operation will herein be described. To this end reference may be had to the published description of any standard type of preselector gear which could be adapted to this purpose. The shaft 15 to which the rocker arm 15a is secured extends within the gearbox 12 to operate the gear pre-selector means, while a second shaft 19 to which is secured the rocker arm 19a extends within the gearbox 12 to operate the gear-change mechanism and the clutch or that which serves as a clutch in change-speed mechanism of this kind. Pre-selective gears of this kind normally are selected manually, as is the case in this arrangement, and usually through a control 17a mounted upon the steering wheel 18, the latter together with the steering column 18a being indicated in Fig. 1. A control rod 17 serves to connect the control 17a through a link 16 to the rocker arm 15a of the gear selector shaft 15 so that the selection of the gears according to an index adjacent the control 17a can be made at will by the driver of the vehicle. To effect the power gear change the gear change rocker arm 19a is linked to the piston rod 21 of a servo motor 20 of the fluid pressure differential type, the cylinder of which is connected by the union 30 with which a fluid conveying pipe 29 through which the cylinder to one side of its associated piston is alternately evacuated and air relieved in the manipulation of the multiple series valves hereinafter described. The valve block 50 is interposed between the fluid conveying pipe 29 and a vacuum pipe 25 which is connected at one end to a vacuum reservoir 26. The reservoir 26 is evacuated through a pipe 27 which is connected to the intake manifold 28 of the engine 10. The engine speed control in this arrangement comprises the usual accelerator pedal 13 pivotally mounted upon a shaft 13a and connected by the rod 14 to the throttle of a carbureter (not shown).

The multiple series valves for controlling the actuation of the servo motor 20 in this arrangement comprise passages formed in the valve block 50 which is secured to some part of the vehicle structure e. g. the engine side of the dash or instrument board (not shown). The valve block 50 is connected on one side thereof by means of the union 59, with the vacuum pipe 25 while the fluid delivery pipe 29, hereinafter known as the servo pipe, is connected to the opposite side of the valve block through the medium of the union 60. Juxtaposed vacuum passages 51, 52, extending across the block 50 from the vacuum side to the servo side thereof are joined at one extremity by a cross passage 53, which communicates with the vacuum pipe 25 through the union 59 and short passage 59a. The further extremities of the vacuum passages 51, 52, are joined by the cross passage 54a to the passage 54 which communicates with the servo motor pipe 29 and union 60 through the short passage 60a. Juxtaposed air passages 55, 56, offset from the vacuum passages, also extend across the block 50 from the vacuum side to the servo side thereof. On the servo side of the block the passages, 55, 56 are joined by the cross passage 54 so as to communicate with the servo motor pipe 29 while the further extremities of the passages 55, 56 pass through the appropriate side of the block and so lie open to the atmosphere.

The communication on the one hand between the servo pipe 29 and atmosphere through the air relief passages 55 and 56, and on the other hand between the servo pipe 29 and vacuum pipe 25 through the vacuum passages 51, 52 is controlled by bifurcated ported valve slide plates 57, 58. Suitable guide slots are cut through the block 50 transversely of the valve passages to receive the slides 57a, 57b and 58a, 58b of the slide plates 57, 58 in such manner that the ported slides 57b, 58b each pass across both air relief passages 55, 56 while the ported slides 57a, 58a each pass across the vacuum passages 51, 52 so that the communication between the connections of these passages is interrupted other than when the ports of the ported slides 57a, 58a or 57b, 58b are brought into register. The slide 57a is provided with an elongated slot or port 84 which is arranged to register in turn with the vacuum passages 51, 52; slide 57b has an elongated port 87 and bleed ports 88, 89, the port 87 being arranged to register in turn with the air passages 55, 56, while the bleed ports 88, 89 in turn register with the air passage 56; slide 58a is provided with two slots or ports 85, 86 which are arranged to register with the vacuum passages 51 and 52 respectively, while slide 58b is formed with a slot or port 92 arranged to register with the air passage 56, and a slotted port 91 and bleed port 90 which in turn register with the passage 55.

The valve slide plate 57 is displaced in accordance with the movement of the accelerator pedal 13 through a linkage comprising the arm 61 secured to the plate 57 and a connecting rod 31 which is pivotally secured at its extremities to the arm 61 and one arm of a bell crank rocking lever 40, the other arm of the latter being slotted to engage a pin 41 extending from a collar 41a which is rigidly secured to the accelerator throttle rod 14. Thus in the longitudinal displacement of the rod 14 the lever 40 is rocked to impart sliding movement to the valve slide 57.

The setting of the second valve slide plate 58 for each gear change is determined directly by the movement of the gear selector control 17a as follows. A vertical, flanged slide member 63 slidably mounted in fixed guides 66 is formed at its extremities with abutments 64, 65 which are bored to form bearing brackets for a rod 67 which is longer than the member 63 and passes through the abutments 64, 65 as shown. The rod 67 which is thus normally positioned as shown is connected at its lower extremity with the rocking arm 15a through the rocking bell crank 36 and connecting rods 35, 35a. The rod 67 is centralized to the slide 63 by means of two comparatively stiff helical compression springs 68, 69 which both embrace the rod so that their adjacent extremities abut either side of a collar 70 secured to the rod 67 while their further extremities engage the inner faces of the abutments 64, 65 respectively. By this arrangement the rod 67 is displaced in the movement of the gear selector shaft 15 and rocking arm 15a and with it is displaced the slide member 63 unless the movement of the latter is resisted by a force greater than the strength of the springs 68, 69. The vertical edge of the flange 63a of the slide member 63 is formed with a series of projections or teeth 63a, 63b, 63c, 63d, and 63e, all of which are of equal width and even pitch, the latter preferably being twice the width of the teeth plus a suitable tolerance. The proportions of the linkage 33, 36, 35a is carefully chosen so that the amplitude of movement of the rod 67 for each gear selection is equal to the pitch of the projections 63a—63b. Moreover, the linkage as shown in Fig. 1 is arranged to move the slide member 63 and rod 67 upwards in the direction of the arrow $u$ as shown in the drawings for changes up to higher ratio gears and downwards in the direction of the arrow $d$ for changes down to gears of lower ratio. Thus the gap 63a—b will correspond to neutral position of the gears, gap 63b—c to first gear, gap 63c—d second gear, gap 63d—e third gear and below 63e top gear, while above 63a will correspond to reverse gear. The valve slide plate 58 carries an arm 62 to which is pivotally secured a slotted lever 72. The lower extremity of the lever 72 is formed with a projection or nose 73 which is arranged to register with and engage any of the gaps between the teeth or projections 63a—e. As shown in Fig. 1 the nose 73 is engaging the gap 63b—c so that in this position of the arrangement the vehicle would be in first gear with the clutch engaged. One arm of a further rocking bell crank 76, which is pivotally mounted at 76a adjacent the lever 72, carries a laterally projecting pin 75 which engages the slot 74 of the lever 72. The other arm 76b of the rocking lever 76 is formed with a collar 78 which embraces a rod 81, a resilient connection between the two last mentioned members being set up by a spring 80 which abuts the underface of the collar 78 and the second collar 79 rigidly secured to the rod 81. The lower extremity of the rod 81 is pivotally linked with the gear change rocking arm 19a through the rocking bell crank 23 and connecting rod 22. Thus in the actuation of the clutch and gear change mechanism the lever 72 is rocked outwardly away from the slide 63 so that the nose 73 disengages the teeth of the slide 63. The valve slide plate 58 normally is held in the position shown in Fig. 1 by the centralizing helical tension springs 82, 83 which are secured at their inner adjacent extremities to a pin 85 extending rigidly from the arm 62, while their outer extremities are anchored to the fixed projections 84, 84.

The operation of this embodiment of the invention will now be described with reference to Figs. 2 to 5 of the drawings in which diagrams, for clearness, the centralizing springs 82, 83 and pin 85 have been shown in a different form. As above mentioned the position of the gear changing mechanism as shown in Fig. 1 indicates that the vehicle is in first gear with the clutch engaged and the accelerator about to be further depressed and throttle opened to speed or run up the engine preparatory to changing up to second gear. The opening of the throttle will move the valve slide plate 57 upwards in the direction of the arrow $c$ while closing the throttle will move the valve slide in the opposite direction so that in running up the engine as above mentioned the valve slide plate 57 will move upwards from the position shown in Fig. 1 to that shown in Fig. 4 so that port 84 in slide 57a will be out of register with vacuum passage 52 but in register with passage 51 and port 88 in slide 57b in register with air passage 56. However the valve slide plate 58 will be set as shown in Fig. 1 with neither port 85, 86 in register with the vacuum passages 51, 52 so that vacuum cannot pass to the servo motor 20, while at the same time the bleed port 90 of slide 58b is in register with air passage 55 to ensure that the servo motor remains inactive. If the driver intends to change up to second gear, he will continue to speed up the engine in first gear and pre-select second gear by moving the selection control 17a to second gear which will move the rocking arm 15a in clockwise direction and thus lift upwardly the rod 67 which will carry therewith the slide member 63 to the position shown in Fig. 2. Through the engagement of the nose 73 of the rod 72 between the teeth 63a and 63b the valve slide plate 58 also will be moved upward to the position shown in Fig. 2 in which the port 85 of slide 58a registers with vacuum passage 52 and port 86 of slide 58a remains out of register with passage 51, while port 92 of slide 58b registers with air passage 56 and ports 90 and 91 of the slide 58b are out of register. It will be understood that with the second gear pre-selected and the accelerator pedal depressed and throttle open to run up the engine speed the vacuum still remains cut off from the servo motor 20 while the air relief also is now cut off. However, when the engine and vehicle reach the right speed for a good change up the driver releases the accelerator pedal to close the throttle as is normal road driving practice in changing up and thus the valve slide 57a is moved downwards to the position shown in Fig. 2. Port 84 in slide 57a now registers with vacuum passage 52 and the cylinder of the servo motor 20 is evacuated through pipe 29, ports 84, 85 in passage 52 and pipe 25. The servo motor 20 is thus energized to operate the clutch and gear changing mechanism through the rocking arm 19a and rocking shaft 19 so that the speed gears are changed to second speed.

The operative movement of gear changing mechanism rocks the bell crank 23 in clockwise direction so that the rod 81 is drawn downwards in turn to rock the bell crank 76 in clockwise direction about its pivot 76a. Thus the lever 72 is moved outwards about its pivot 75 and the nose 73 thereof tripped from the teeth 63b, 63c as shown in chain dotted lines in Fig. 2. Urged by the tension spring 83 the valve slide plate 58 again moves downwards to the centralized position shown in Fig. 3 in which position the ports 85, 86 are moved out of register with the vacuum passages 52, 51 thus cutting off the servo 20 from the vacuum reservoir while the bleed port 90 in slide 58b registers with the air passage 55. Since the throttle remains closed during the gear changing operation port 87 in slide 57b also is in register with the air passage 55 so that the vacuum in the cylinder of the servo 20 is relieved by air flowing along the passage 55 through ports 87, 90 and then through pipe 29. The rate at which air enters the servo motor is controlled by the size of the bleed port 90 allowing sufficient time for the engine revolutions to drop to the required extent to ensure a smooth re-engagement of the clutch means in second gear. It will be understood that in the clutch re-engagement the piston of the servo motor 20 will return to the position shown in Fig. 1 which will normalize the lever 72 through the linkage described so that the nose 73 will again engage between two of the teeth of the member 63. Since the normal position of the member 63 is directly dependent upon the manual setting of the pre-selector mechanism which will still be in second gear the nose 73 will engage between teeth 63c and 63d in readiness to impart to the valve slide plate 58 further displacing movement according to the pre-selection of the next gear to be engaged. Further changes up to top gear may be made in a manner similar to that above described but if a higher gear ratio is pre-selected on the over-run of the engine, i. e., with the throttle closed, the gear change will follow immediately upon the setting of the preselection mechanism the change taking place unostentatiously and smoothly.

When it is desired to change down to a lower gear ratio than that in which the vehicle is being driven the movements of the gear preselection mechanism and therefore the valve slides and the associated controlling mechanism are reversed. Assuming that the lower ratio gear is selected when the throttle is closed the change down to the selected gear will not occur until the accelerator is again pressed down to open the throttle. The movement of the manual control 17a to select a lower gear will rock the rocking bell crank 15 in anti-clockwise direction which in turn will pull the rods 35 and 67 downwards. The slide 63 thus will also be moved downwards carrying therewith the lever 73, arm 62 and valve slide 58 to the position shown in Fig. 4, i. e. with port 86 of slide 58a registering with vacuum passage 51. If the throttle is now opened the valve slide 57 will be moved up to the position shown in Fig. 4 so that port 84 of slide 57a also registers with vacuum passage 51 and the cylinder of the servo motor 20 is exhausted along the last mentioned passage through the registering ports, thus energizing the motor to effect the clutch-disengagement and change-down of the gears. As above described the valve slide plate 58 will at once be centralized but in this instance by the spring 82 to assume the position shown in Fig. 5 so that port 92 in slide 58b registers with air passage 56 while the connection between the servo motor and vacuum source along passage 51 and through ports 86 and 84 is cut off by the displacement of port 86. Air is now admitted to the servo motor 20 along passage 56, through port 92 and one of the ports 87, 88 or 89 in slide 57b according to the degree of throttle opening so that the engagement of the clutch or its equivalent, such as the appropriate brake bands of epicyclic gears if such are used, is regulated according to the engine speed and thus achieved with smoothness and ease.

If the change down is being effected while braking so that by reason of the speed of the vehicle the slow clutch engagement is undesirable this operation may be varied by the driver as follows. Immediately following the change down to the preselected gear effected as above described by opening the throttle, the latter is closed; the closing of the throttle immediately after the gear change down, moves the valve slide plate 57 downwards so that port 87 in slide 57b registers with the air relief passage 55 and the large port 91 in slide 58b which at this instant is still in register with passage 55 since the valve slide plate 58 has not yet been released to the upward pull of the spring 82. Vacuum in the cylinder of the servo motor 20 thus is quickly destroyed and the drive of the vehicle immediately taken up through the clutch means.

If a lower gear is selected when the throttle is open, as when accelerating or climbing a hill, the change takes place immediately following the setting of the gear selection controls, the cycle of operation in the change down being precisely similar to that first described.

When it is desired to place the clutch means or change speed gears in neutral in bringing the vehicle to a standstill the manual control 17a is set to neutral and the throttle momentarily opened which achieves the gear change as in the changing-down operations above described. When starting the vehicle from a standstill in neutral gear, first gear is preselected with the throttle partially open; releasing the throttle evacuates the servo motor 20 through ports 84, 85 along passage 52 to achieve the change to first speed gear and the throttle is again opened to de-energize the servo motor by air relief through bleed port 89 and the overlap of port 92 along air passage 56.

The extent of the sliding movement of the valve slide plate 58 is limited by the pin 75 engaging the slot 74 of lever 72, the slot 74 being of such length that the displacement of the slide member 63 and consequently the lever 72 and valve slide plate 58 cannot be more in either direction than the pitch length of the teeth of the member 63. Thus if the selector control 17a is inadvertently displaced for a distance equal to two or more gear settings, the valve slide plate 58 can only be displaced the correct distance for the requisite valve setting, the springs 68, 69 constituting a lost motion device in that one of these springs will compress and the other extend when the rod 67 overruns the maximum displacement of the slide 63. As shown in Fig. 6, if, in changing up, the gear preselecting device is advanced two stages in the one movement the rod 67 will be moved upwards for a corresponding distance i. e. twice the distance normal for a single change up step. The slide 63 and valve slide plate 58 will move with the rod 67 until the lower end of the slot 74 encounters the pin 75 whereupon the slide 63, lever 72 and valve slide plate 58 are halted while the compression of the upper spring 68 between the abutment 64 and collar 70 permits the overrun of the rod 67 while the lower spring 69 will extend as shown or lie free if the limit of its extension is reached.

The provision of change speed gear self-selecting and self-changing mechanism and automatic clutch control according to the present invention for use in racing cars will now be described with reference to Figs. 7 to 11 of the accompanying drawings. Referring more particularly to Fig. 7, it will be seen that the essential components of the arrangement are similar to those described in reference to the first constructional embodiment and comprise the prime mover or power unit 10, flywheel housing 11, combined clutch and pre-selection gear-set 12 and propeller shaft 11a, the gear-set and clutch being power operated by means of the servomotor 20 which is served by pipe 29 and connected through a multi-series valve block 50 and pipe 25 to a vacuum reservoir 26 which, in turn, is connected by pipe 27 to the inlet manifold of the power unit 10. In this arrangement the passages of the valve block 50 are modified and comprise a single vacuum passage 51 and a single air relief passage 55, the vacuum passage being connected at one extremity to the vacuum pipe 25 through the union 59 and at its further extremity to a cross passage 54 which communicates with the union 60 of the servo-pipe 29, while the air passage 55, open at one extremity to the atmosphere, also communicates with the pipe 29 through the union 60. As in the first embodiment, two ported, bifurcated valve slide plates 57, 58, are mounted in the block 50 so that the slides 57a, 58a intersect the vacuum passage 51 while the slides 57b, 58b intersect the air relief passage 55. In this embodiment however, slide 57a is provided with a slot or elongated port 115, arranged to register with vacuum passage 51, slide 58a is provided with two ports 114, 116, each of which registers in turn with vacuum passage 51, slide 57b has ports 131, 132, each of which registers in turn with air passage 55, while slide 58b has port 130 which registers with air passage 55. In this arrangement the direction of movement of the valve slide plate 57 is reversed, i. e. when the accelerator pedal 13 is depressed to open the throttle (not shown) the valve slide plate 57 is moved downwards in the direction of the arrow c. To this end the rocking bell crank 40, which is slotted to receive the pin 41 carried by the collar 41a secured to the throttle rod 14, is faced about upon its pivot so that its response to the movement of the rod 14 is opposite to that of the first embodiment and the connecting rod 31, linked to the arm 61, is caused to pull the slide valve plate 57 downwards when the throttle is opened.

The arm 62 attached to the valve slide plate 58 extends downward and is shaped at its lower extremity in the form of a flat topped, wide faced cam 62a the face of which is associated with two cam follower levers 93, 94 which are pivotally mounted upon pivot pins 95, 96 respectively, so that their fixed extremities are closely adjacent. The cam-engaging faces 93a, 94a at the adjacent extremities of the levers 93, 94 are shaped in a curvature substantially corresponding to the rise of the cam 62a and terminating in shoulders 93b, 94b which are engaged by the cam 62a in its displacement so that the levers 93, 94 in turn are rocked outwardly about their pivot pins 95, 96. The outer edges 93c, 94c of the levers 93, 94 are inclined inwardly towards the free extremities of the levers so that when the shoulder 93b and 94b rides up upon the cam face 62a and the corresponding lever is rocked outwards, e. g., the lever 94 as shown in full lines in Fig. 7, the inclined edge 94c, as shown, lies parallel with the longitudinal edges of the lever 62 for a purpose hereinafter described.

Parallel with the arm 62 and adjacent thereto is slidably mounted in guides (not shown) a gear selecting rod 102 which is secured at its lower extremity by the links 35, 35a and rocking bell crank 23 to the gear selecting rocker arm 15a of the gear set 12. The rod 102 carries teeth or projections 102a–f which project towards the plane in which lie the levers 93, 94, the edges of the teeth being square cut while the upper face of the tooth 102b and under face of the tooth 102e are ramped for a purpose hereinafter described. A pair of levers 98, 99 mounted upon a fixed pivot 97 and normally held closed by a helical tension spring 97a applied to adjacent extremities thereof are positioned so that the further extremities of the levers which are bent to provide fingers 98a, 99a lie between the arm 62 and gear selecting rod 102 and beyond the plane of the teeth of the latter member and the cam follower levers 93, 94. Pawl members in the form of short bars 100, 101 which extend from the rod 102 to the levers 93, 94 are pivotally mounted upon the levers 98, 99, respectively by means of short arms 100a, 101a, the latter being pivoted at the base of the fingers 98a, 99a. Compression springs 100b, 101b interposed between the finger 98a and pawl 100 and finger 99a and pawl 101 urge these members towards the teeth on the rod 102, the arrangement being such that the pawls, 100, 101 are each permitted to engage the teeth of the rod 102 when the cam follower levers 93, 94 are deflected inwardly as the lever 93 is shown in Fig. 7, while the pawls are deflected clear of the teeth when the levers 93, 94 are rocked outwards, as the lever 94 is shown in the same figure of the drawings. The piston of the servo motor 20 is connected to the levers 98, 99 by the cable 103 so that in the gear-changing and clutch-disengaging movement these levers are spread apart in the manner of a pair of scissors by a pull on the cable 103 whereupon the spring loaded pawl members 100, 101 move in opposite directions, i. e., down and up respectively. If the arm 62 is moved downwardly so that its cammed extremity rocks lever 94 outwards and permits lever 93 to move inwards as shown in full lines in Fig. 7 the falling pawl 100 will be deflected by the edge 94c of the lever 94 and thus ride over the tooth or projection 102d while the rising pawl 101, undeflected by the inwardly reclining lever 93, will fall behind the tooth 102c and engage therewith thereby pushing the gear-selecting rod 102 upwards to select a higher gear ratio through the linkage 35, 35a, 23, 15a, 15. Conversely, if the arm 62 is moved upwards prior to the spread of the levers 98, 99 the cam follower levers 93, 94 assume the position shown in chain-dotted lines in Fig. 7 so that the rising pawl 101 is deflected by the lever edge 93c while the falling pawl 100 is permitted to engage the upper face of tooth 102d so that the rod 102 is moved down to select a lower gear ratio through the linkage above mentioned. The movement of the gear-selecting rod 102 to its lowest position, i. e. with the uppermost tooth 102a in register with the pawl 101, would be equivalent to reverse gear-setting of the gear-set 12 and the ramping of the upper face of the adjacent tooth 102b is for the purpose of preventing the pawl 100 from engaging this tooth and thus forcing the rod 102 downwardly beyond this point. The position of the rod as shown in Fig. 7 with tooth 102c registering with the pawl 101 represents the first gear setting. The location of tooth 102b in this position would represent neutral gear, tooth 102d in a similar position would represent second gear, tooth 102c in this position third gear, while tooth 102e would be moved to this position in the selection of top gear. The underface of tooth 102e is ramped to prevent the engagement therewith of the pawl 101 so that the selection rod 102 cannot inadvertently be carried upwards beyond the top gear position. The setting of the valve slide plate 58 through the medium of the arm 62 is achieved through a pivotal lever 104, which is pivotally mounted intermediate its length at 104a above the levers 98, 99 and extends parallel therewith. One extremity of the lever 104 passes between a pair of pins 62b, 62c which project from the valve slide arm 62 while the further extremity of the lever 104 is resiliently held between two helical tension springs 105, 106, the spring 105 being anchored to a stationary part of the vehicle frame, while the spring 106 is secured to a link 107 which is connected by a cable 33a to the brake pedal 33. Thus in the depression of the brake pedal 33 the arm 62 and valve slide plate 58 are moved upward from the position shown in Fig. 7 by the movement of the lever 104 in clockwise direction, the latter being restored to the position shown by the pull of the spring 105 when the brake pedal is raised. A pin or stop 108 projects from the valve slide arm 61 to engage the upper edge of the lever 104 when the throttle is fully open and additional pressure upon the accelerator pedal beyond this point causes the stop 108 to carry the lever 104 downwards in an anticlockwise direction about its pivot 104a thus carrying the valve slide arm 62 and valve slide plate 58 downwards as shown in Fig. 8. A push rod 111, pivoted at one extremity to the lever 104, has a slot 110 provided in its further extremity to engage a pin 109 which projects from the lever 98. Through the push rod 111 the lever 104 is raised or centralized when the levers 98, 99 are fully spread and the pin 109 engages the upper end of the slot 110. As shown in Figs. 8, 9, and 10 a make and break device in the form of a pair of contact springs 112 could be incorporated in the circuit of the engine ignition and associated with the lever 104 as shown or with the valve slide arm 62 in their downward position to cut-out the ignition and prevent undue racing of the engine when changing, as is a desirable practice to ease the transmission in a long race.

The operation of this embodiment of the invention is as follows. Assuming that the throttle is fully open as when running up the engine say in second gear the stop 108 on the arm 61 would abut the upper edge of the lever 104, while the gear-selecting mechanism would be as shown in Fig. 7, i. e. with second gear selected. To change up to a higher gear ratio further pressure upon the accelerator pedal 13 draws the valve slide plate 57 and arm 61 further downwards and moves the lever 104 anticlockwise about the pivot 104a and against the tension of the spring 106, so pressing arm 62 downwards to set the valve slide plate 58 as shown in Fig. 8. With the valve slides in this position port 115 in slide 57a and port 116 in slide 58a register with vacuum passage 51 so that the servo motor 20 is energized and the disengagement of the clutch means effected. It will be noted that the ignition is cut out by the contact springs 112 when the clutch means are disengaged. Since the valve slide plate 58 is in its lowest position the cam 62a also is lowered so that in the spread of the levers 98, 99 which is caused by the pull on the cable 103 at the completion of the servo-clutch-disengaging operation the rising pawl 101 engages the tooth 102c and thus lifts the rod 102 to select a higher ratio gear while the falling pawl 100 is of course deflected by the cam follower lever 94. In the completion of the spreading movement of the levers 98, 99 the pin 109 riding the slot 110 in the lever 111 reaches the end of the slot and carries the lever upwards to restore the lever 104, valve slide arm 62 and valve slide plate 58 to the position shown in Fig. 9 wherein port 130 in slide 58b and port 131 in slide 57b register with air passage 55 so to admit air to the servo motor and thus effect re-engagement of the clutch means, while of course in the upward movement of the lever 103 the contact springs are opened to restore the ignition circuit. The throttle is restored from the extreme open position to the normal full open position shown in Fig. 9 in effecting the re-engagement of the clutch means, it will be appreciated that the change up with an open throttle is usual practice in racing cars. Moreover, in racing cars the driver invariably is braking when changing down and the movement of the brake control is utilized to achieve automatically the gear selection to a lower ratio gear and operation of the clutch means. Assuming that the car is running in top gear with the driver desiring to change down to third the teeth 102e, 102f would be registered with the pawls 101 and 100 respectively. Application of the brake 33 will rock the lever 104 in clockwise direction so that the arm 62 and valve slide plate 58 are carried upwards in which position the cam 62a will be raised and port 114 of slide 58a will register with the vacuum passage 51 as shown in Fig. 10. Since the throttle is still open port 115 of slide 57a also is in register with vacuum passage 51 so that the servo motor 20 is energized to disengage the clutch means. The resulting pull upon the cable 103 spreads the levers 98, 99 so that the pawls 100, 101 fall and rise respectively and since the cam 62a is now in the upper position the rising pawl 101 is deflected from the tooth 102e while the falling pawl 100 engages the tooth 102f and so moves the gear selecting lever downwards to select a lower ratio gear. As shown in Fig. 11, with the valve slide plate 58 in the upper position port 130 in slide 58b is in register with air passage 55 and to effect the re-engagement of the clutch means the throttle is closed which moves port 115 in slide 57a from register with vacuum passage 51 to cut off the vacuum and brings port 132 in slide 57b into register with air passage 55 so that the servo motor 20 is de-energized and air admitted thereto to permit the clutch re-engagement while the brake is still applied.

Another example of fully automatic gear selecting and gear changing mechanism constructed according to the present invention for application to ordinary road vehicles will now be described with reference to Figs. 12 to 23. Referring to Fig. 12 it will be seen that, as in the case of the above described embodiments, the gear selecting and changing mechanism is applied to the control of a combined pre-selective gear set and clutch indicated by the reference 12, through the medium of multi series valves interposed between the vacuum reservoir 26 and the servo motor 20. As in the first described embodiment the valve block 50 of this embodiment is provided with two vacuum passages 51, 52 and two air passages 55, 56 while the bifurcated valve slide plates 57, 58 are ported as follows: Slide 57a is provided with an elongated slot or port 130 which registers in turn with each of the vacuum passages 51, 52: slide 58a is formed with ports 129, 131 which register in turn with the vacuum passages 52, 51 respectively. Slide 57b is formed with an elongated port 137 which registers with air passage 55, and bleed ports 179, 180 which register in turn with air passage 56. Slide 58b is provided with an elongated port 146 which registers with air passage 56, and a port 143 and bleed port 136 which in turn register with air passage 55. In this embodiment the valve slide plate 57 moves upwards, as viewed in Fig. 12, when the throttle is opened while the valve slide plate 58 is moved downwards in selecting the gears for changes down to lower ratio gears and upwards in selecting the gears for changes up to higher ratio gears. Movement of the accelerator pedal 13 and throttle rod 14 imparts movement to the valve slide plate 57 through the linkage comprising the rocking bell crank 40, pin 41, connecting rod 31 and valve slide arm 61 while this valve slide plate 57 also is displaced as desired by means which engage a pin 164 projecting from the valve slide arm 61.

As in the second described embodiment the gear selection is determined by a flat topped cam 62a formed at the lower extremity of the valve slide rod 62 which of course is secured to the valve slide plate 58 and moves therewith; in this arrangement, however, the last mentioned members instead of being centralized between two tension springs, normally are urged upwards, as viewed in Fig. 12, by a rat trap spring 117 through the medium of a lever 118, which is pivoted at one extremity upon a spindle or stub shaft 165, while its further free extremity passes betweeen a pair of pins 119, 120 which project from the valve slide arm 62. A disc-like plate 142 rotatably mounted also upon the stub shaft 165 has a second stub shaft or bearing pin 167 projecting therefrom to provide a mounting both for the helical coil of the spring 117 and a pivotal plate or lever 166, the edge 166a of which is engaged by the second limb of the spring 117 and thus urged against an abutment or stop 168 projecting from a flatted edge of the plate 142. The opposed faces of the plate 142 and lever 166 lie substantially parallel and spaced apart while an abutment 169 projects from the said face of the lever 166 for a purpose hereinafter described. The upward spring urged movement of the valve slide plate 58 and arm 62 is, in certain circumstances, resisted by a spring loaded, positive throw tumbler lever 122 which is mounted upon a stationary pivot 122a and has a suitable projection or thrust face on its lower edge which bears against a pin 121 projecting from the arm 62. The spring-urged throw of the tumbler lever is achieved by providing a pin 123, rigidly secured to one extremity of the lever, which slides in the slot 125 of a plate 124, the latter being rotatably mounted upon a pivot 124a. A helical compression spring 127 positioned between an abutment 124b of the plate 124 and the pin 123 reacts from the abutment on to the pin to urge the lever 122 in a clockwise or anticlockwise direction about the pivot 122a according to the rotary position of the plate 124. When the lever 122 tumbles its movement is limited by the pin 123 reaching the end of the slot 125 while just after it passes over dead centre and so tumbles in a clockwise direction the free extremity thereof engages a pin 128 which projects from the valve slide arm 61. The engagement of the lever 122 and pin 128 is made as shown in Fig. 12 when the throttle is closed. Thus, when the throttle is opened and the arm 61 moves upwards the displacement of the pin 128 moves the lever 122 anticlockwise over its dead centre whereupon the lever automatically completes the full tumble and so disengages pin 121 to free valve slide 58 to its spring-urged upward movement so that port 129 in slide 58a is brought into register with vacuum passage 52 which however remains closed by reason of the position of the valve slide 57a when the throttle is open. The arrangement of the automatic gear selecting mechanism of this embodiment is substantially similar to that described in reference to the second embodiment although the parts are turned about so as to face the plate 142. The levers 98, 99 carrying the spring loaded pawls 101 and 100 respectively are spread apart by the pull of the cable 103, which is secured at its extremities to the levers 98, 99 and servo motor 20, so that pawl 100 rises and pawl 101 falls. The cable 103 is connected to the servo motor 20 by a slotted or overriding link 103a so that the levers 98, 99 are not spread until after the clutch disengagement is effected.

In this case, however, when the cam 62a is in the upper position the falling pawl 101 will engage a tooth of the gear selecting rod 102 and displace the latter downwardly to select a higher ratio gear while, with the cam 62a in the lower position, the rising pawl 100 will engage a tooth of the rod 102 and move the latter upwards to select a lower ratio gear. Therefore, the tooth 102a which forms a cross head at the upper extremity of the rod 102 is brought into register with pawl 100 when the vehicle is in top gear.

The end of lever 98 extreme from its pawl 101 carries a lever 79 pivoted thereto at 80 and indented at its upper extremity to engage a pin 135 projecting from tumbler lever 122. The changeable angular position of the lever 79 is located by a cross bar 133 pivoted at one extremity to the former at 81 and slotted at its further extremity to engage a pin 134 projecting from the plate 142. A helical spring 136 secured to the pin 134 and an abutment 133a of the bar 133 normally locates the pin at the outer extremity of the slot. Normally the extremity of the lever 79 is aligned with pin 135 so that when the levers 98, 99 are spread following a power gear change or clutch disengagement the lever 79 moves upwards, engages pin 135 and tumbles the lever 122 clockwise whereupon the latter engages pin 128 and re-centralizes the valve slide plate 57 to the position shown in Fig. 12.

When the gear selecting rod 102 is in its lowest position with top gear engaged the underface of tooth 102a presses upon the free extremity of a pivotal lever 138 mounted upon a fixed pivot 138a. A stiff tension spring 139 stronger than the spring 117 links the lever 138 to the free extremity of lever 118 so to prevent the upward spring urged movement of arm 62 and valve slide plate 58 when the vehicle is running in top gear and the lever 122 tumbled to free arm 62 which, as above explained, occurs when the throttle is opened. If provision is not made thus for locking the movement of the valve slide plate 58 engagement and re-engagement of the clutch and/or an abortive attempt to change gear will occur each time the throttle is closed to ease the engine when running in top gear.

The lower extremity of the valve slide arm 62 is connected through a short stiff spring 160, and cable 161 to the brake pedal 33 so that when the brakes are applied valve slide 58 is moved downwards to register the port 131 of slide 58a with vacuum passage 51 while moving port 146 of slide 58b from air passage 56. This downward movement of the valve slide plate 58 and arm 62 is limited by a stop 141 which projects from the plate 142 to engage the lower edge of the lever 118. Means for controlling the rotation of the plate 142 will herein after be described.

A three arm lever 145 is pivotally mounted intermediate the valve slide arms 61, 62 so that one arm 145a thereof engages a pin 146 projecting from the bar 133, the second arm 145b engages the pin 121 when the valve slide plate 58 is raised and the third arm 145c engages a pin 144 projecting from valve slide arm 61 when the latter is raised. A further rod 148 is pivotally secured at its lower extremity to lever 99, the upper extremity of this rod passing between pins 149, 150 which project from the bar 133.

The operation of this constructional embodiment of the invention in automatically changing the gear ratios during the running of the vehicle is as follows. Assuming that the third gear and clutch of the vehicle have just been engaged with the throttle closed the position of the mechanism will be as shown in Fig. 12, i. e. valve slide plate 57 is fully down and valve slide plate 58 is centralized and locked against upward movement by the tumbler lever 122. Moreover, the third gear has been selected by downward movement of the gear selecting rod 102 in the last gear change so that the teeth 102b, 102c register with the pawls 100, 101 respectively which are both deflected from the engaging position by the cam followers 93, 94 which in turn are held outwardly by the centralized cam 62a. Prior to changing up to the next selected gear, the accelerator pedal 13 is depressed to open the throttle and so moves valve slide plate 57 and arm 61 upwards. The upwardly displaced pin 128 moves the lever 122 anticlockwise about its pivot so that lever 122 tumbles to the position shown in Fig. 13 thus freeing arm 62 and valve slide plate 58 which are urged upwards by the spring 177 to the position also shown in Fig. 13 so that port 129 in slide 58a registers with vacuum passage 52, although the latter remains closed while the throttle is open and valve slide plate 57 held in upward position. When suitable engine speed has been reached and it is desired to change up to the top gear the throttle is closed so that valve slide plate 57 is moved downwards to the position as shown in Fig. 13 in which position port 130 in slide 57a registers with vacuum passage 52 which is thus opened to energize the servo motor 20 whereupon the disengagement of the clutch means is automatically effected. At the end of the last mentioned operation a pull on the cable 103 spreads the levers 98, 99 raising the pawl 100 and lowering the pawl 101 and since the cam 62a is in the raised position the rising pawl 100 will remain deflected from tooth 102b while the falling pawl 101 will engage tooth 102c thus moving the rod 102 downwards to select top gear. While the levers 98, 99 are spreading to the maximum extent the rising lever 79 engages the pin 135 projecting from the tumbler lever 122 and the latter is thrown in clockwise direction to reassume the position shown in Figs. 12 and 14, thus re-engaging the pin 121 on valve slide arm 62 and so moving valve slide plate 58 downward to the position shown in Fig. 14 with port 136 in slide 58b registering with air passage 55. In this position of the valve slides, vacuum passages 51, 52 are closed while air is admitted to the servo motor 20 through port 137, bleed port 136 and air passage 55, thus effecting a smooth clutch re-engagement and gear take-up.

Assuming that it is desired to change down to a lower gear ratio say from third to second gear while braking as when descending a hill the procedure is equally simple. The application of the footbrake 33 which most probably is already made in such circumstances, serves to pull down the valve slide plate 58 through cable 161, spring 160 and arm 62 to the position shown in Fig. 15 so that port 131 in slide 58a registers with vacuum passage 51. This passage however remains closed while the throttle is closed, which would be the case when braking. To effect the change down the throttle is opened as in normal driving practice whereupon the slide 57a is raised so that port 130 also registers with passage 51 and the servo motor 20 is evacuated through ports 130, 131 and vacuum passage 51 to effect the disengagement of the clutch means. As in the above described changing-up operation the final effort of the servo motor exerts a pull on the cable 103 to spread the levers 98, 99 but in this case since the cam 62a is in the lower position the falling pawl 101 remains deflected from tooth 102c while the rising pawl 100 moves behind tooth 102b and so raises the rod 102 to select a lower ratio gear. As above described the rising push lever 79 then engages pin 135 and returns the lever 122 to the position shown in Figs. 12 and 16 so moving valve slide plate 57 downwards to close passage 51 and register port 137 of slide 57b with passage 55 whereupon air is admitted to the servo motor 20 through ports 137, 143 and passage 55 (Fig. 16) to permit the re-engagement of the clutch means and gear drive. This movement incidentally also effects closing of the throttle on completion of the change down.

Release of the footbrake 33 will restore the slide plate 58 to central position locked by the reset tumbler lever 122 and thus the throttle can be opened to run up the vehicle in the changed gear without effecting clutch disengagement.

To change down to a lower gear ratio under power as when hill climbing additional depression of the accelerator pedal 13 against a stiff auxiliary spring (not shown) is required. Assuming again that the change down is to be from third to second gear the arrangement of the parts, other than valve slide plate 57 and tumbler lever 122, would be as shown in Fig. 12. Tumbler lever 122, however, would have been rocked about its pivot and valve slide plate 57 moved upwards by the opening of the throttle in running up the engine in third gear. In depressing the pedal 13 beyond full throttle opening position the pin 144 carried by valve slide arm 61 is moved upwards to engage the arm 145c of lever 145 which thus is rocked in anticlockwise direction about its pivot. Arm 145c of lever 145 now engages pin 121 of arm 62 thus moving the latter together with the valve slide plate 58 to the lower position as shown in Fig. 17. In the rotary movement of the lever 145 the arm 145a of which engages the pin 146, the cross bar 133 is displaced to the right (as viewed in the drawings) against the spring 136 so that the push lever 79 is also displaced to the right away from the pin 135. In the movement of the cross bar 133 the push lever 148 is moved between the pins 149, 150 about its pivot to align with the pin 121 as shown in Fig. 17. As shown in Fig. 17 the upward movement of the valve slide plate 57 has brought port 130 into register with vacuum passage 51 while the downward movement of valve slide plate 58 brings port 131 of slide 58a also in register with this passage so that the servo 20 is energized to effect the disengagement of the clutch means and gear selection as previously described. As shown in Fig. 18 in the completion of the gear selecting movement of the levers 98, 99 the upwardly moving push lever 148 is engaged with pin 121 thus to centralize valve slide plate 58 and close vacuum passage 51 while registering port 146 in slide 58b with air passage 56, with which port 137 is already in register, thereby to admit air to the servo 20 to permit the re-engagement of the clutch means. The reaction of the spring 136 of course returns the bar 133 and push levers 148 and 79 to the normal position shown in Fig. 12.

This arrangement is rendered fully automatic in the clutch control and gear changing functions as above stated by means which disengages the clutch means and shifts the gear back to first speed as the vehicle slows to a very low speed. To this end an auxiliary power device 162 which is responsive to the engine speed is associated with the gear changing mechanism. This device is shown in the form of a pressure servo which is responsive to the oil pressure of the engine 10 to which it is connected by a supply pipe 162a; in this arrangement when the oil pressure from the engine or transmission driven circulating pump or other pressure system falls at low engine speed a spring 162b moves a piston 162c against the fallen pressure in the cylinder of the device. As shown, the piston rod 163 of the servo-device 162 is connected through a pivotal drag link 164 with the rotary disc or plate 142 positively to move the latter at low engine speed in clockwise direction about the stub shaft 165. For a purpose hereinafter described the plate 142 is also provided around its edge with a segmental lateral abutment 178 and a tooth-like projection 171.

In this embodiment as shown in Figs. 12, 22, and 23 the head of the lever 99 is provided with an extension 160 in the form of an arm 170a which carries at its free extremity a butt plate 170 which extends to engage the under curved edge of the projection 169 carried by the lever 166. Moreover a bar 172 is secured to the pivotal end of the cam follower 94 and projects therefrom to engage the tooth or projection 171 carried by the plate 142.

Pivotally mounted above the plate 142 is a further three arm plate 173 one arm 174 of which is bifurcated to form a gear-selecting fork which, when suitably positioned, engages the cross head or tooth 102a of the gear selecting rod 102. A second arm 175 is pivotally linked to a hand control rod 176 which extends to the instrument board or other place easily accessible to the driver of the vehicle. The third arm 174a which is more in the nature of a hump is formed with an arcuate outer edge struck upon a radius having its centre upon the axial line of the pivot 174b said edge being serrated as shown and positioned to engage the edge 178a of the abutment 178 on plate 142, after same has been rotated.

Assuming that the vehicle is being brought to a standstill after running in top gear; at a set minimum engine speed the servo power device 162 is operated and, through the drag link 163, displaces the plate 142 in clockwise direction about the pivot shaft 165. This displacement of plate 142 moves cross bar 133 to the right so moving push lever 79 from alignment with the pin 135; in the same movement of plate 142 the projection 141 engages the lower edge of lever 118 and so moves the valve slide arm 62 and valve slide plate 58 upwards against the pull of both the locking spring 139 and brake control spring 160 should these be exerting such pull. At the same time, the movement of lever 166 and displacement of its pivot 167, which are carried in clockwise direction by the plate 142 positions its projection 169 immediately above the butt plate 170. The free extremity of lever 166 thus takes up a position beneath the upper tooth 102a of the gear selecting rod 102 which will be in its lowest position (i. e. in top gear). Also the projection 171 on plate 142 now engages the bar 172 so as to prevent cam follower 94 from riding down the cam 62a which has been raised in the upward movement of valve slide 62 (see Fig. 19).

With the mechanism in this position port 129 of slide 58a is in register with vacuum passage 52, as shown in Fig. 19, but if the throttle is kept partly open as when crawling in a line of traffic no gear changing action will take place because port 130 in slide 57a will be out of register with passage 52 which thus will remain closed. Therefore if the vehicle is accelerated out of its critical minimum speed the motor 162 will be re-set or otherwise react accordingly to move plate 142 in anticlockwise direction thus to normalize the mechanism. However, should the throttle be closed when the vehicle is at this critical minimum speed and the mechanism consequently set as described the valve slide plate 57 will move down to register port 130 with vacuum passage 52 so that the servo motor 20 will be energized through ports 129, 130 and vacuum passage 52 to disengage the clutch means and finally spread the levers 98, 99 by a pull exerted on cable 103 (Fig. 19). The butt plate 170 will now press upwardly against the cammed surface of the projection 169 carried by plate 166 thus moving the latter in clockwise direction and away from stop 168 about its pivot 167 against the force of the spring 177. The upwardly moving free extremity of lever 166 now engages tooth 102a and lifts the gear selecting lever 102 up to the position corresponding to first gear (Fig. 20). If now halted the vehicle comes to a standstill with clutch disengaged and first gear selected in readiness for a fresh start.

In moving the gear selecting rod 102 upwards and just before reaching first gear position the cross head or tooth 102a encounters the longer prong 174a of the lever 174 and, due to the change of position of the last mentioned member which thereupon moves with the rod, enters between the prongs 174a, 174b upon reaching the first gear position. The described movement of the lever 174 does not affect the manual control rod 176 owing to the pin and slot connection between these members.

When the gear selecting mechanism is set as above described the push-pull rod 176 is connected directly to the gear selector rod 102. If the rod 176 be now pushed inwards to its full extent in the direction of arrow 177 the arm 174 will be further rotated in clockwise direction thus carrying the gear selecting rod 102 to its extreme upward position to select reverse gear. Moved inwards to less than its full extent the rod rotates lever 173 in clockwise direction but to a lesser extent and thereby moves the gear selecting rod 102 to select neutral so providing a positive neutral for use when warming up or tuning the engine. However, the serrated arcuate edge 174a of lever 173 engages the edge 178 of the abutment 178A on plate 142 in such manner that the lever 174 can only be rotated through rod 176 to select reverse or neutral when the plate 142 is rotated by servo motor 162 upon the vehicle coming to a standstill.

If, when the gears are set in neutral, the throttle is opened and engine speeded up thus normalizing the servo motor 162, the plate 142 is prevented from returning to the position shown in Fig. 12 by the engagement of the forward edge 178a of the abutment 178 with the serrated edge of lever arm 174a. Thus, no intermittent movement of the gear changing mechanism can be set up in racing up and slowing the engine while in neutral and conversely the gears cannot be changed from neutral when the engine is racing.

In starting the vehicle from a standstill in either first or reverse gears, when the throttle is opened the valve slide plate 57 is moved up and port 130 is out of register with vacuum passage 52 so that the latter is closed to cut off the vacuum to servo motor 20 as shown in Fig. 21. In the same movement of the valve slide 57 the bleed port 179 in slide 57b registers with air passage 56 so that air flows along this passage through ports 146, 179 to de-energize the servo-motor 20 and thus effect a smooth engagement of the clutch means and gears.

The selector rod 102 for the six gear positions i. e. reverse and neutral, first, second, third, top, should have seven teeth one of which is the cross piece 102a on the rod 102. However, the three lowermost teeth on the rod of which only the lowermost 102g is shown in the drawings preferably are bridged to form a continuous surface to prevent the gear selecting pawls 100, 101 from acting thereon contrary to the manual settings for neutral and reverse gears. In addition, as in the previously described embodiment the teeth 102b and 102d (not shown in Fig. 12) are faired or ramped from their crowns to the bases of 102a and 102e respectively to prevent undesired displacement of the gear selecting rod 102 beyond the desired limits of its movement, i. e., automatic change from first to neutral gears and attempted downward movement of the rod beyond top gear position.

A further constructional form of semi-automatic clutch operating and gear changing mechanism for carrying this invention into effect will now be described with reference to Figs. 24 to 34. Referring more particularly to Fig. 24, in this modified arrangement, the layout and function of the essential components of the arrangement are as described in reference to Fig. 12. A two-stage multi-series valve block 50 is provided as in the last described embodiment but the valve slide plates 57, 58 of this arrangement are ported as follows: an elongated port 193 is provided in slide 57a to register in turn with the vacuum passages 51, 52; ports 194 and 203 are formed in slide 58a to register in turn with vacuum passages 51, 52 respectively; slide 57b is provided with a port 200 arranged to register with air passage 56, and ports 199 and 205 which register in turn with air passage 55 while slide 58b is formed with port 201 and bleed port 204 which register in turn with air passage 56, and a port 202 arranged to register with air passage 55. In this arrangement however the valve slide plate 57 is not connected directly to the accelerator pedal 13 but has movement transmitted to it from the accelerator pedal 13 and throttle rod 14 through a lever 181 which is mounted at one extremity on a stationary pivot while its free extremity passes between pins 184, 185 which project from the valve slide arm 61. A slide bar 180 mounted in guides (not shown) is linked by a rod 180a to the throttle rod 14 and carries a pair of pins 182, 183 which also engage the lever 181; thus, movement of the pedal 13 is transmitted to the valve slide plate 57. The lever 181 is allowed a certain amount of play between pins 184, 185 for a purpose hereinafter explained. For certain reasons the air passage 56 is reduced in height but not in breadth, i. e., it is reduced only in direction of slide movement. In this embodiment the valve slide plate 57 is moved upward for closed throttle and downward when the throttle is opened but normally is urged upward by a helical compression spring 186 which is seated on a stationary seating plate 187 from which it reacts against the foot 61a. The upward movement of the valve slide plate 57 and arm 61 is limited by a projecting stop 188 which abuts the free end of a lever 189 which is pivotally mounted intermediate its length upon a fixed pivot. The further end of the lever 189 beds upon a compression spring 190 which is seated upon a fixed bracket 190a so that the upward movement of the valve slide plate 57 is made against the force of the spring 190 which is comparatively strong and stronger than the spring 186. A rod or, as shown, a cable 192 attached to the spring-bedded end of lever 189 connects the latter to a control 192a placed preferably on the dash board of the vehicle so that a pull applied manually to cable 192 will overcome the force of the spring 190 and thus permit the upward spring urged movement of valve slide plate 57.

Moreover, in this arrangement the accelerator pedal 13 is provided with a toe-strap 13b which may be a rigid clamp as shown so that after pressure on the pedal is relieved by lift of the driver's foot the further raising thereof will force the connecting rod and slide bar 180 upwards, the compression spring 14a being interposed in the throttle rod 14 to take up the overthrust of the pedal 13. In the upward movement of slide bar 180 in this manner the pin 183 locks lever 181 upwards so that the arm 61 and valve slide plate 57 are also in this manner moved upwards against the force of spring 190 to register port 193 of slide 57a with vacuum passage 51. At the same time a pin 195 projecting from the upwardly moving slide bar 180 engages the lower edge of a pivotal lever 196 the free extremity of which rests upon a pin 211 projecting from the valve slide arm 62 with which it normally is held in engagement by a stiff helical tension spring 197. The arm 62 and valve slide plate 58 thus are moved upwards so that the cam 62a is raised. The lower extremity of arm 62 is connected by the cable 161 with the rod of the brake pedal 33. A pin 210 also is provided on the slide bar 180 for a purpose hereinafter described. Normally the arm 62 is centred by the anchored helical tension springs 208, 209 which are secured to a projection 207 extending from the arm 62.

The operation of this embodiment of the invention is as follows: Since port 194 of slide 58a is always in register with vacuum passage 51 a pull, manually applied at any time, to the cable 192 will disengage the clutch by moving valve slide plate 57 upwards to register port 193 in slide 57a with passage 51 so that this passage is opened through ports 193, 194 to energize the servo 20. Free wheeling of the vehicle can thus be obtained in any gear merely by the manipulation of hand control 192a.

To change up to a higher ratio gear in this arrangement foot pressure on the accelerator pedal is released and the accelerator moved upwards by upward pressure on the toe-strap 13b. The valve slide plate 57 is thus moved upwards through the linkage above described and port 193 in slide 57a registers with vacuum passage 51 as shown in Fig. 25 to energize the servo 20 and thus effect clutch disengagement and finally the spreading of the gear selecting levers 98, 99 by the pull applied to the cable 103. The raised position of cam 62a sets the cam followers 93, 94 so that the rising pawl 100 is deflected from the teeth of the gear selecting rod 102 while the falling pawl 101 engages a tooth of the rod and so presses the latter downwards. As in the last described embodiment, downward movement of the rod 102 effects a change up to a higher gear ratio which is thus automatically selected. When the accelerator pedal is released to its normal position shown in Fig. 24 the valve slide plate 57 is urged downwards by spring 190 which displaces port 193 and closes vacuum passage 51, while bringing port 200 of slide 57b into register with air passage 56. At the same time the release of the upward thrust of the accelerator pedal also permits the springs 208, 209 to centralize valve slide plate 58 so that bleed port 204 in slide 58b also registers with air passage 56 as shown in Fig. 26 and air thus is admitted to the servo motor 20 to effect a smooth re-engagement of the clutch means. If the accelerator pedal 13 is heavily depressed immediately the gear change is effected port 205 in slide 57b is brought into register with air passage 55, with which port 202 in slide 58b is already registered so that the servo motor is relieved through passage 55 to effect the re-engagement (Fig. 27).

To change down to a lower gear ratio while braking, it will be understood that valve slide plate 58 will be pulled downwards so that port 203 in slide 58a registers with vacuum passage 52. If the throttle is then opened, thus pulling valve slide plate 57 downwards, port 193 will also register with vacuum passage 52 so that the latter is opened to energize the servo 20 and disengage the clutch means and spread the levers 98, 99 (Fig. 28). As is now well understood the cam 62a being in the lowermost position will permit the rising pawl 100 to engage and lift the gear selector rod upwards to select a lower ratio gear. When the pedal 13 is again released to close the throttle, the valve slide plate 57 is moved upwards by spring 186 so that vacuum passage 52 is closed while port 200 in slide 57b registers with air passage 56a with which port 201 in slide 58b is already registered so that passage 56, 56a is opened to admit air to the servo 20 to effect smooth re-engagement of the clutch means (Fig. 29).

Change down to a lower ratio gear under full throttle, i. e. when climbing a hill, is achieved as follows: At full throttle the pin 210 projecting from slide bar 180 will just be touching the upper edge of lever 196. Further pressure upon the accelerator beyond full throttle opening therefore will force arm 62 and valve slide plate 58 downwards to register port 203 in slide 58a with vacuum passage 52. Since the throttle is open, port 193 in slide 57a also is registering with passage 52 (see Fig. 30) so that the servo 20 is energized to disengage the clutch means and achieve a change down to a lower gear ratio which follows by reason of the cam 62a being in the lower position. As shown in Fig. 31 release of the accelerator pedal to normal full depression leaves the throttle open for continuity of the power change down but allows the arm 62 and valve slide plate 58 to be centralized by spring 208 so that vacuum passage 52 is closed while port 202 in slide 58b is registered with passage 55 with which port 199 in slide 57b is already in register. Air passage 55 is thus opened to admit air to the servo motor 20 whereupon the re-engagement of the clutch means is effected.

The disengagement of the clutch means and re-setting of the gears to first gear ratio when the speed of the vehicle falls below a certain predetermined minimum is controlled in this embodiment of the invention by the following means. The rotary plate 142 in this case is abbreviated to the form of a sector pivoted upon a fixed pivot 165 and provided with a baulking projection 178 as before, but in this case resiliently located by contact with a compression spring 215 which is seated upon a fixed bracket 216 so that the plate 142 normally is located in the position shown in Fig. 24 but can be displaced for a limited distance in clockwise direction about its pivot 165. The plate 142 has secured thereto a branch 161a of the brake cable 161 so that the application of the brake by depressing pedal 33 rotates plate 142 in clockwise direction against the force of spring 215. As in the last embodiment the lever 166 is pivoted to plate 142 at 167 and carries an abutment 169. A hollow tubular rod 219 pivoted at its upper extremity to the free extremity of lever 181 extends to the lever 166 so that a slot 218 formed in its further extremity engages a pin 217 projecting from the plate 142 and carrying a buffer or pad 220. A long, light helical compression spring 221 and a rebound spring 222 are housed in the tubular rod 219 so that their adjacent extremities abut the pad 220 while their further extremities are held or limited in movement as desired. When lever 18 is in the normal position shown in Fig. 24 and plate 142 is turned to its lower position by a pull applied to brake cable 161a, the pivot 167 is of course also moved downwards so that lever 166 assumes a position with the abutment or projection 169 close to the plate 170 of the lever 99 (approaching the position shown in Fig. 33).

Assuming, therefore, that, in bringing the vehicle to a standstill, the throttle is closed and the brake applied so that plate 166 is moved to the position described and shown in Fig. 33, to reset the gears to first gear it is necessary merely to move the pedal 13 beyond the position for throttle closure by pressure applied to the toe-strap 13b so that, through the linkage above described in reference to the third embodiment, the lever 181 is raised and thus, through rod 219, the plate 166 will be rotated clockwise about pivot 167 sufficiently to bring the projection 169 above the upper face of the plate 170. At the same time the valve slide plate 57 is moved upwards to register port 193 in slide 57a with vacuum passage 51 as shown in Fig. 33. Thus the passage 51 is opened through port 193 and port 194 (which constantly registers with this passage) and the servo motor 20 is energized to effect dis-engagement of the clutch means and finally operate levers 98, 99 to rise pawl 100 and fall pawl 101 in usual manner. Since valve slide plate 58 and arm 62 are pulled downwardly by the brake application cam 62a will also be in its lowermost position and therefore pawl 100 will engage and move the gear selecting rod 102 upwards to the next gear position. However, the plate 170 carried by lever 99 will also move upwards to engage projection 169 on lever 166 so rotating the latter in clockwise direction whereupon the plate 166b positioned at the full extremity of lever 166 engages the cross head 102a and lifts the rod 102 upwards to select first gear as shown in Fig. 34; or, if desired, and so arranged, to move the rod 102 to neutral gear position. Due to the play permitted the lever 181 between pins 184 and 185, the additional upward movement of arm 61, when the free-wheeling control 192a is operated, is not communicated to lever 181 so as to affect the position of lever 166. The reverse control is manually operated as already described in relation to the third embodiment. To start the vehicle again in first or reverse gear, the accelerator is again depressed which reacts slide plates 57, 58, so that the vacuum passage 51 is closed and the port 200 in slide 57b together with bleed port 204 in slide 58b registered with air passage 56, 56a so that air is admitted to the servo motor to effect re-engagement of the clutch means.

From the above description of the mechanism for carrying this invention into effect in a fully or semiautomatic manner it will be appreciated that, except when the vehicle is coming to a standstill, the gear changing operation is in the full control of the driver who can determine the moment of the change and select a lower or higher gear as desired. Therefore, the sole error which can be perpetrated with this system is for the driver to force a lower gear ratio than the existing engine speed will accept.

It will be realized that for the sake of clearness the constructional embodiments of this invention have been shown in purely diagrammatic form. The views 1, 7, 12, and 24 to some extent have been exploded while pivots, bearings and supporting members are shown unattached although it will be appreciated that every component of the mechanism could readily be attached to a convenient part of the vehicle structure.

The valve block 50, and slide plates 57, 58 as shown, are in rectangular form.

I claim:

1. A motor vehicle which includes a prime mover, an accelerator to control said prime mover, a brake control, clutch means and change-speed gears to transmit the power of said prime mover to said vehicle, an element operable to disengage said clutch means and effect gear changing movements of said change-speed gears, a power device to operate said gear changing element, and means for controlling the actuation of said power device by the combined movements of said brake control and said gear changing element.

2. A motor vehicle which includes a prime mover, an accelerator to control said prime mover, a brake control, clutch means and change-speed gears to transmit the power of said prime mover to said vehicle, an element operable to disengage said clutch means and effect gear changing movements of said change-speed gears, a power device to operate said gear changing element, and means for controlling the actuation of said power device by the combined movements of said accelerator and said brake control.

3. A motor vehicle which includes a prime mover, an accelerator to control said prime mover, a brake control, clutch means and change-speed gears to transmit the power of said prime mover to said vehicle, an element operable to disengage said clutch means and effect gear changing movements of said change-speed gears, a power device to operate said gear changing element, and means for controlling the actuation of said power device by the combined movements of said accelerator said brake control and said gear-changing element.

4. A motor vehicle which includes a prime mover, an accelerator to control said prime mover, clutch means and change-speed gears to transmit the power of said prime mover to said vehicle, an element operable to disengage said clutch means and effect gear changing movements of said change-speed gears, a fluid actuated power device to operate said gear changing element, and means for creating a fluid pressure differential to energize said power device, said last mentioned means including multiple series valves interposed in the fluid circuit of said power device, and means for selectively controlling said valves by the combined movements of said accelerator and said gear changing element.

5. A motor vehicle which includes a prime mover, an accelerator to control said prime mover, a brake control, clutch means and change-speed gears to transmit the power of said prime mover to said vehicle, an element operable to disengage said clutch means and effect gear changing movements of said change-speed gears, a fluid actuated power device to operate said gear-changing element, and means for creating a fluid pressure differential to energize said power device, said last mentioned means including multiple series valves interposed in the fluid circuit of said power device, and means for selectively controlling said valves by the combined movements of said accelerator and said brake control.

6. A motor vehicle which includes a prime mover, an accelerator to control said prime mover, a brake control, clutch means and change-speed gears to transmit the power of said prime mover to said vehicle, an element operable to disengage said clutch means and effect gear changing movements of said change-speed gears, a fluid actuated power device to operate said gear changing element, means for creating a fluid pressure differential to energize said power device, said last mentioned means including multiple series valves interposed in the fluid circuit of said power device, and means for selectively controlling said valves by the combined movements of said brake control and said gear changing element.

7. A motor vehicle which includes a prime mover, an accelerator to control said prime mover, a brake control, clutch means and change-speed gears to transmit the power of said prime mover to said vehicle, an element operable to disengage said clutch means and effect gear changing movements of said change-speed gears, a fluid actuated power device to operate said gear changing element, and means for creating a fluid pressure differential to energize said power device, said last mentioned means including multiple series valves interposed in the fluid circuit of said power device, and means for selectively controlling said valves by the combined movements of said accelerator, said brake control and said gear changing element.

8. A motor vehicle which includes a prime mover, an accelerator to control said prime mover, a brake control, clutch means and change-speed gears to transmit the power of said prime mover to said vehicle, an element operable to disengage said clutch means and effect gear changing movements of said change speed gears, a power device to operate said gear changing element, means for manually controlling the selection of said change speed gears, and means for controlling the actuation of said power device by the combined movements of said accelerator, said gear-changing element, and said gear selection control.

9. A motor vehicle which includes a prime mover, an accelerator to control said prime mover, a brake control, clutch means and change-speed gears to transmit the power of said prime mover to said vehicle, an element operable to effect gear changing movements of said change-speed gears, a fluid actuated power device to operate said gear changing element, means for manually controlling the selection of said change-speed gears, and means for creating a fluid pressure differential to energize said power device, said means including multiple series valves interposed in the fluid circuit of said device and means for selectively controlling the said valves by the combined movements of said accelerator, said gear changing element and said gear selection control.

10. A motor vehicle which includes a prime mover, an accelerator to control said prime mover, a brake control, clutch means and change-speed gears to transmit the power of said prime mover to said vehicle, an element operable to disengage said clutch means and effect gear changing movements of said change-speed gears, a power device to operate said gear changing element, a member operable to select a desired gear, means for mechanically operating said gear selecting member, means for determining said mechanical gear selection by the movement of said brake control, and means for controlling the actuation of said power device by the combined movements of said accelerator and said gear changing element.

11. A motor vehicle which includes a prime mover, an accelerator to control said prime mover, a brake control, clutch means and change-speed gears to transmit the power of said prime mover to said vehicle, an element operable to disengage said clutch means and effect gear changing movements of said change-speed gears, a fluid actuated power device to operate said gear changing element, a member operable to select a desired gear, means for mechanically operating said gear selecting member, means for determining said mechanical gear selection by the movement of said brake control, means for creating a fluid pressure differential to energize said power device, said last mentioned means including multiple series valves interposed in the fluid circuit of said power device, and means for selectively controlling said valves by the combined movements of said accelerator and said gear changing element.

12. A motor vehicle which includes a prime mover, an accelerator to control said prime mover, a brake control, clutch means and change-speed gears to transmit the power of said prime mover to said vehicle, an element operable to disengage said clutch means and effect gear changing movements of said change-speed gears, a power device to operate said gear changing element, a member operable by said power device to select a desired gear, means actuated by said brake control to determine the selection of said gear, and means for controlling the actuation of said power device by the combined movements of said accelerator and said brake control.

13. A motor vehicle which includes a prime mover, an accelerator to control said prime mover, a brake control, clutch means and change-speed gear to transmit the power of said prime mover to said vehicle, an element operable to disengage said clutch means and effect gear changing movements of said change-speed gears, a fluid actuated power device to operate said gear changing element, a member operable by said power device to select a desired gear, means actuated by said brake control to determine the selection of said gear, and means for creating a fluid pressure differential to energize said power device, said last mentioned means including multiple series valves interposed in the fluid circuit of said power device, and means for selectively controlling said valves by the combined movements of said accelerator and said brake control.

14. A motor vehicle which includes a prime mover, an accelerator to control said prime mover, a brake control, clutch means and change-speed gears to transmit the power of said prime mover to said vehicle, a member operable to select a desired gear, an element operable to effect gear changing movements of said clutch means and change-speed gears, a power device to operate said gear changing element, means for controlling the actuation of said power device by the combined movements of said accelerator and said brake control, and a second power device to operate said gear selecting member, said last mentioned power device operating in response to variations in the speed of said prime mover.

15. A motor vehicle which includes a prime mover, an accelerator to control said prime mover, a brake control, clutch means and change-speed gears to transmit the power of said prime mover to said vehicle, a member operable to select a desired gear, an element operable to effect gear changing movements of said clutch means and change-speed gears, a fluid actuated power device to operate said gear changing element, means for creating a fluid pressure differential to energize said power device, said last mentioned means including multiple series valves interposed in the fluid circuit of said power device, and means for selectively controlling said valves by the combined movements of said accelerator and said brake control, and a second power device to operate said gear selecting member, said last mentioned power device operating in response to variations in the speed of said prime mover.

16. A motor vehicle which includes a prime mover, an accelerator to control said prime mover, a brake control, clutch means and change-speed gears to transmit the power of said prime mover to said vehicle, an element operable to disengage said clutch means and effect gear changing movements of said change speed gears, a power device to operate said gear changing element, means for controlling the actuation of said power device by the combined movements of said accelerator and said brake control, and a manually operable device to dominate the control of said power device by said brake control so as to enable said power device to disengage said clutch means to permit free wheeling of the vehicle.

17. A motor vehicle which includes a prime mover, an accelerator to control said prime mover, a brake control, clutch means and change-speed gears to transmit the power of said prime mover to said vehicle, an element operable to disengage said clutch means and effect gear changing movements of said change-speed gears, a fluid actuated power device to operate said gear changing element, and means for creating a fluid pressure differential to energize said power device, said last mentioned means including multiple series valves interposed in the pressure circuit of said power device, means for selectively controlling said valves by the combined movements of said accelerator and said brake control, and a manually operable device to dominate the control of said power device by said brake control so as to cause said power device to disengage said clutch means to permit free-wheeling of the vehicle.

18. A motor vehicle which includes a prime mover, an accelerator to control said prime mover, a brake control, clutch means and change-speed gears to transmit the power of said prime mover to said vehicle, an element operable to disengage said clutch means and effect gear changing movements of said change speed gears, a power device to operate said changing element, means for controlling the actuation of said power device by the combined movements of said accelerator and said brake control, a manually operable device to dominate the control of said power device by said brake control so as to enable said power device to disengage said clutch means to permit free wheeling of the vehicle, and mechanism actuated by said manually operable device to select a higher ratio of said change speed gears in which again to take up the drive of the vehicle.

19. A motor vehicle which includes a prime mover, an accelerator to control said prime mover, a brake control, clutch means and change-speed gears to transmit the power of said prime mover to said vehicle, an element operable to disengage said clutch means and effect gear changing movements of said change-speed gears, a fluid actuated power device to operate said gear changing element, and means for creating a fluid pressure differential to energize said power device, said last mentioned means including multiple series valves interposed in the fluid circuit of said power device, means for selectively controlling said valves by the combined movements of said accelerator and said brake control, a manually operable device to dominate the control of said power device by said brake control so as to cause said power device to disengage said clutch means to permit free-wheeling of the vehicle, and mechanism actuated by said manually operable device to select a higher ratio of said change speed gears in which again to take up the drive of the vehicle.

20. A motor vehicle which includes a prime mover, an accelerator to control said prime mover, clutch means and change-speed gears to transmit the power of said prime mover to said vehicle, an element operable to disengage said clutch means and effect gear changing movements of said change-speed gears, a power device to operate said gear changing element, means for controlling the actuation of said power device by the combined movements of said accelerator and said brake control, and a manually operable device to set the change speed gears to neutral or reverse as desired.

21. A motor vehicle which includes a prime mover, an accelerator to control said prime mover, a brake control, clutch means and change-speed gears to transmit the power of said prime mover to said vehicle, an element operable to disengage said clutch means and effect gear changing movements of said change-speed gears, a fluid actuated power device to operate said gear changing element, means for creating a fluid pressure differential to energize said power device, said last mentioned means including multiple series valves interposed in the pressure circuit of said power device, means for selectively controlling said valves by the combined movements of said accelerator and said brake control, and a manually operable device to set the change speed gears to neutral or reverse position as desired.

22. A motor vehicle which includes a prime mover, an accelerator to control said prime mover, clutch means and change-speed gears to transmit the power of said prime mover to said vehicle, an element operable to disengage said clutch means and effect gear changing movements of said change-speed gears a power device to operate said gear changing element, means for controlling the actuation of said power device by the combined movements of said accelerator and said brake control, a manually operable device to set the change speed gears to neutral or reverse as desired, and means automatically to baulk the manipulation of said change speed gears to neutral and reverse until the vehicle is substantially at a standstill.

23. A motor vehicle which includes a prime mover, an accelerator to control said prime mover, a brake control, clutch means and change-speed gears to transmit the power of said prime mover to said vehicle, an element operable to disengage said clutch means and effect gear changing movements of said change-speed gears, a fluid actuated power device to operate said gear changing element, means for creating a fluid pressure differential to energize said power device, said last mentioned means including multiple series valves interposed in the fluid circuit of said power device, means for selectively controlling said valves by the combined movements of said accelerator and said brake control, a manually operable device to set the change speed gears to neutral or reverse position as desired, and means automatically to baulk the manipulation of said change speed gears to neutral and reverse until the vehicle is substantially at a standstill.

24. A motor vehicle which includes a prime mover, an accelerator to control the speed of said prime mover, clutch means and change-speed gears to transmit the power of said prime mover to said vehicle, an element operable to disengage said clutch means and effect gear changing movements of said change-speed gears, a vacuum motor arranged to operate said gear changing element, a source of vacuum, a valve block having passages therein connected to said motor and said source of vacuum, ported valve slides arranged to intersect said passages, means for connecting one of said slides to said accelerator, and means for displacing another of said slides in the movement of said gear changing element, said motor being alternately energized and de-energized when said slides are moved to predetermined positions in the operation of said accelerator and said gear-changing element.

25. A motor vehicle which includes a prime mover, an accelerator to control the speed of said prime mover, a brake control, clutch means and change-speed gears to transmit the power of said prime mover to said vehicle, an element operable to disengage said clutch means and effect gear changing movements of said change-speed gears, a vacuum motor arranged to operate said gear changing element, a source of vacuum, a valve block having passages therein connected to said motor and said source of vacuum, ported valve slides arranged to intersect said passages, means for connecting one of said slides to said accelerator, and means for connecting another of said slides to said brake control, said motor being alternately energized and de-energized when said slides are moved to predetermined positions in the operation of said accelerator and said brake control.

ROBERT CECIL CLERK.